(12) United States Patent
Rofougaran

(10) Patent No.: US 8,200,156 B2
(45) Date of Patent: Jun. 12, 2012

(54) APPARATUS FOR ALLOCATION OF WIRELESS RESOURCES

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 370 days.

(21) Appl. No.: 12/475,501

(22) Filed: May 30, 2009

(65) Prior Publication Data

US 2009/0239483 A1 Sep. 24, 2009

Related U.S. Application Data

(63) Continuation-in-part of application No. 11/700,285, filed on Jan. 31, 2007, now Pat. No. 8,116,294.

(51) Int. Cl.
*H04B 7/00* (2006.01)

(52) U.S. Cl. ............ 455/41.2; 257/25; 455/509; 455/62

(58) Field of Classification Search .................. 455/450, 455/451, 452.1, 452.2, 455, 41.1, 41.2, 41.3, 455/509, 511, 512, 513, 515, 516, 517, 526, 455/62, 63.1, 63.3, 67.11, 67.13; 257/25
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A * | 5/1998 | Metze | 455/41.2 |
| 5,786,912 A | 7/1998 | Kartalopoulos | |
| 5,809,321 A | 9/1998 | Hansen et al. | |
| 5,884,104 A | 3/1999 | Chase et al. | |
| 6,182,203 B1 | 1/2001 | Simar | |
| 6,438,622 B1 | 8/2002 | Haghighi | |
| 6,500,070 B1 | 12/2002 | Tomizawa et al. | |
| 6,663,295 B2 | 12/2003 | Kami et al. | |
| 6,735,663 B2 | 5/2004 | Watts, Jr. et al. | |
| 6,735,708 B2 | 5/2004 | Watts, Jr. | |
| 6,801,974 B1 | 10/2004 | Watts, Jr. et al. | |
| 6,816,925 B2 | 11/2004 | Watts, Jr. | |
| 7,065,326 B2 | 6/2006 | Lovberg | |
| 7,082,285 B2 | 7/2006 | Linde | |
| 7,149,837 B2 | 12/2006 | Watts, Jr. et al. | |

(Continued)

FOREIGN PATENT DOCUMENTS

EP 1499070 A2 1/2005

(Continued)

OTHER PUBLICATIONS

Bruce K Gale, "RF, Electrical, and Magnetic Microsystems," date unknown, 8 pages.

(Continued)

*Primary Examiner* — Ping Hsieh
(74) *Attorney, Agent, or Firm* — Garlick & Markison; Holly L. Rudnick

(57) ABSTRACT

An integrated circuit (IC) includes a plurality of circuit modules, a millimeter wave (MMW) transceiver, a controller. The controller is further operably coupled to: obtain potential inter-chip millimeter wave (MMW) communication links within a device; identify at least one of the inter-chip potential inter-chip MMW communication links as being a dedicated point-to-point MMW link; determine requirements to establish the dedicated point-to-point MMW link; and, when inter-chip MMW resources are available to support the requirements, allocate the inter-chip MMW resources to support the dedicated point-to-point MMW link.

25 Claims, 19 Drawing Sheets

U.S. PATENT DOCUMENTS

| | | |
|---|---|---|
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 * | 7/2008 | Hsu .............................. 370/329 |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchiyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0146199 A1 | 6/2010 | Shaeffer |

FOREIGN PATENT DOCUMENTS

| | | |
|---|---|---|
| WO | 2009002464 A2 | 12/2008 |

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, p. 5.

Haworth, et al.; Public Security Screening for Metallic Objects with Millimetre-Wave Images; Heriot-Watt University; United Kingdom; pp. 1-4.

Elsadek, et al.; "A Compact 3-D Microwave Holographic Pointer System Using a Size Reduced Microstrip Planar Array"; Department of Electrical and Computer Engineering; University of California; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4.

E3 Wii Controller; Nintendo Wilmote; Technology Limitations; XGAMING, Inc.; pp. 1-5.

* cited by examiner

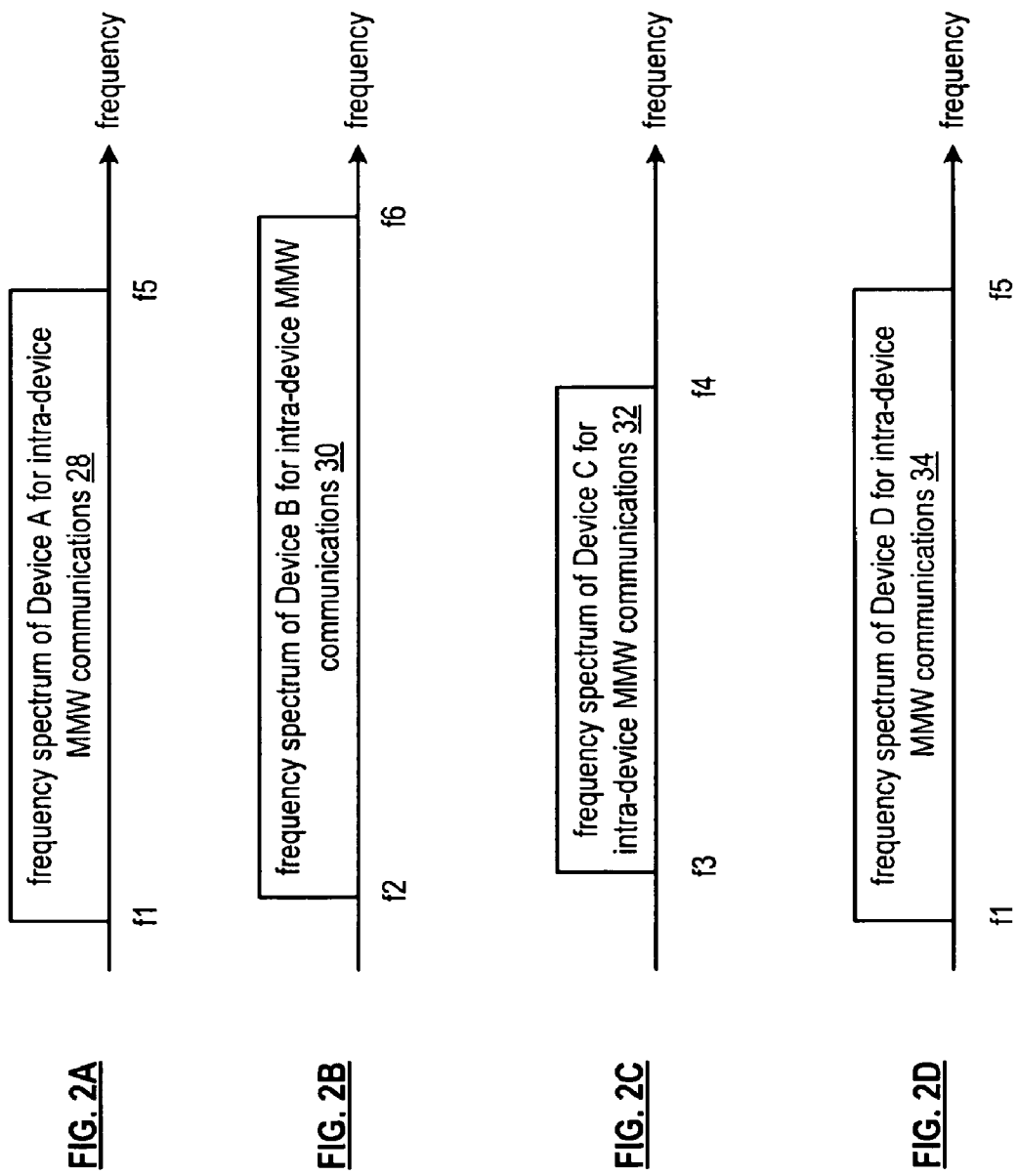

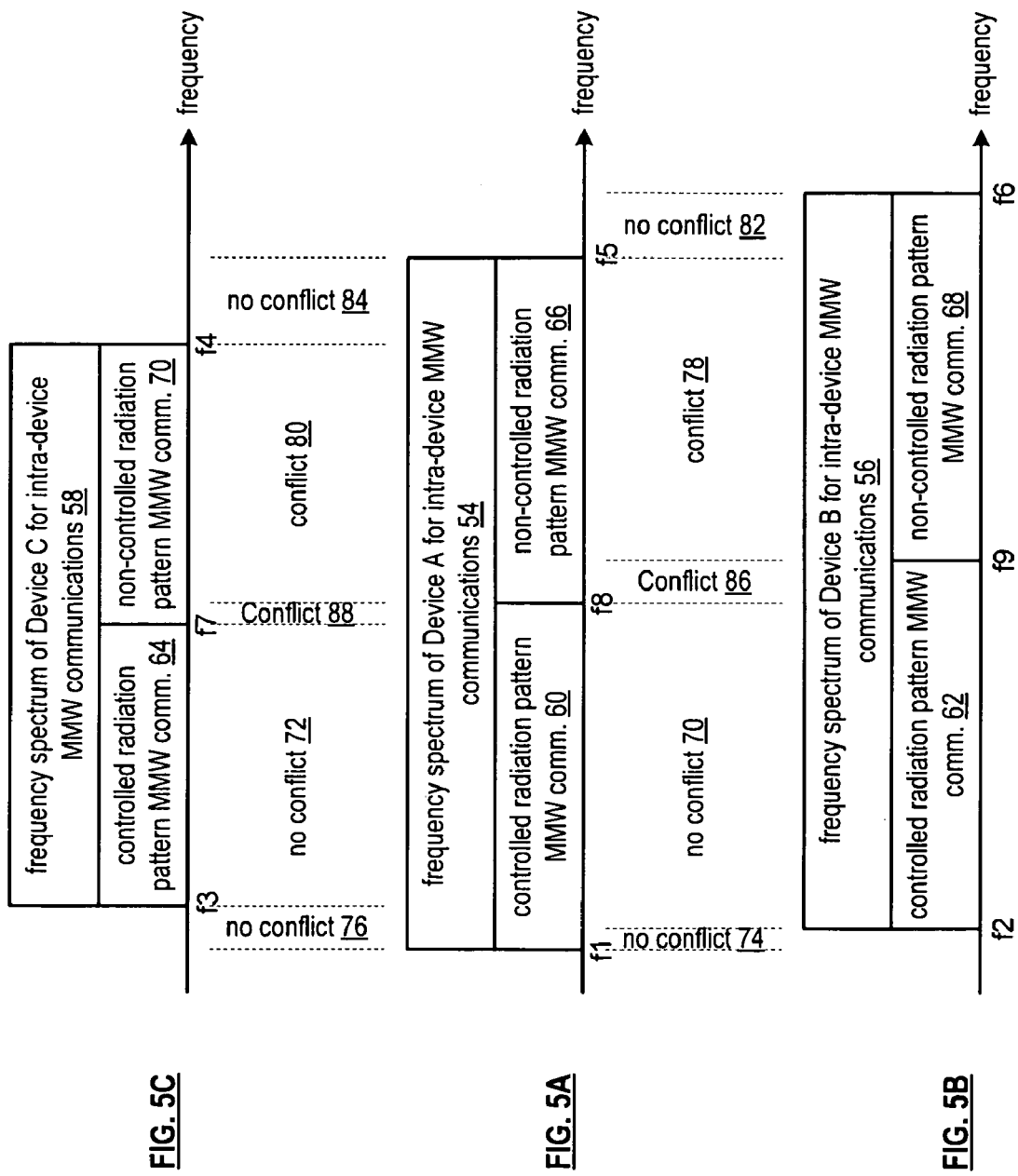

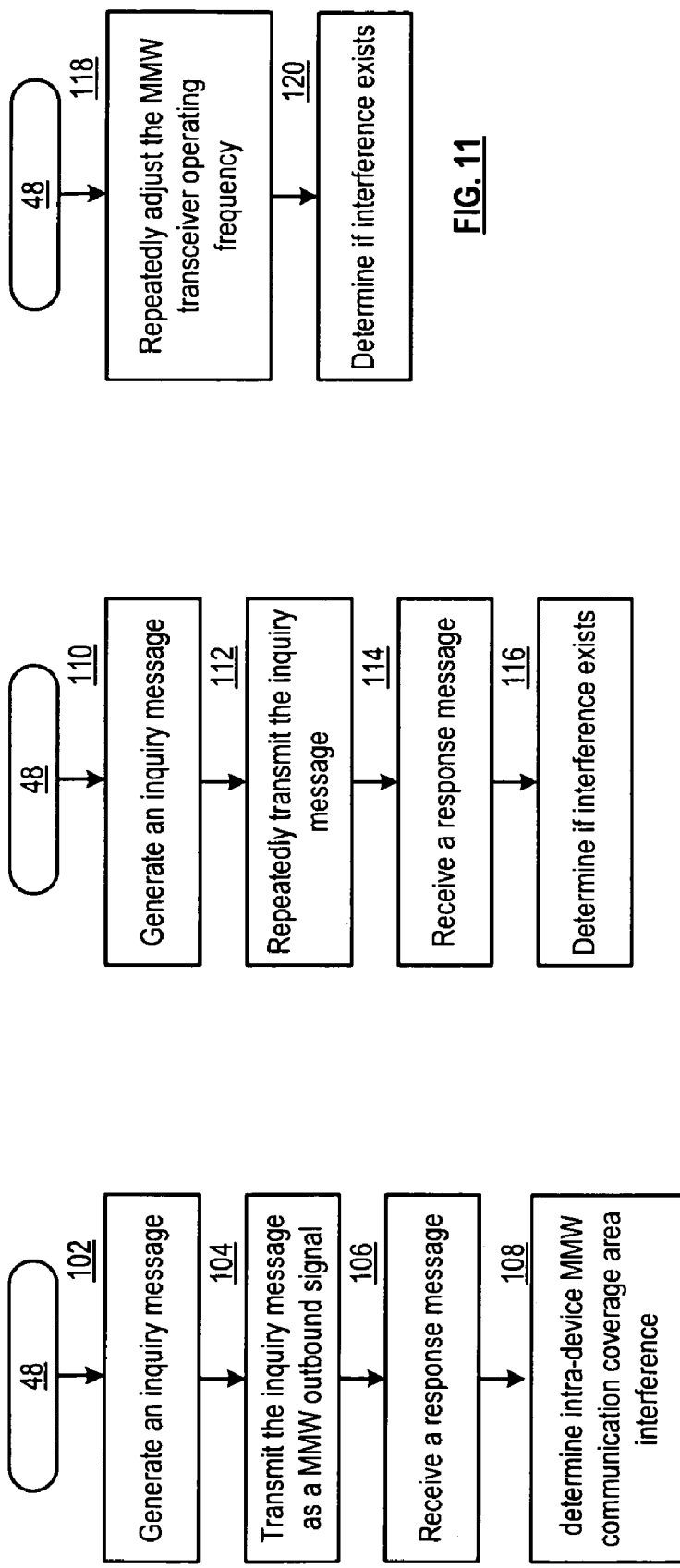

APPARATUS FOR ALLOCATION OF WIRELESS RESOURCES

CROSS-REFERENCE TO RELATED APPLICATIONS

This patent application is claiming priority under 35 USC §120 as a continuation in part patent application of patent application entitled RF BUS CONTROLLER, having a filing date of Jan. 31, 2007, and an application Ser. No. 11/700,285 now U.S. Pat. No. 8,116,294.

This patent application shares a common set of drawings and a common detailed description of the invention with co-pending patent applications entitled APPARATUS FOR CONFIGURATION OF WIRELESS OPERATION, having the same filing date as the present patent application, and an application Ser. No. 12/475,500, and APPARATUS FOR MANAGING FREQUENCY USE, having the same filing date as the present patent application, and an application Ser. No. 12/475,503.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communications and more particularly to allocation of wireless resources.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, IEEE 802.15.4, Bluetooth, global system for mobile communications (GSM), enhanced data rates for GSM evolution (EDGE), universal mobile telecommunications system (UMTS), long term evolution (LTE), IEEE 802.16, evolution data optimized (EV-DO), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Many of the communication devices include a similar basic architecture: that being a processing core, memory, and peripheral devices. The memory stores operating instructions that the processing core uses to generate data, which may also be stored in the memory. The peripheral devices allow a user of the communication device to direct the processing core as to which programs and hence which operating instructions to execute, to enter data, etc. and to see the resulting data. For example, a cellular telephone includes a keypad, a display, a microphone and a speaker for such functions. Typically the processing core, memory and other elements of the communication device are implemented in one or more integrated circuits (IC) that are inter-coupled by traces on common printed circuit boards. The interconnections carry control and content messages between the ICs to enable the device to fulfill its function.

A typical IC includes components (e.g. transistors, capacitors, resistors, and inductors) configured to form a plurality of circuits (e.g. logic gates, flip-flops, multiplexers, amplifiers, and other circuits). Combinations of the circuits can produce circuit modules such as a memory array, a microprocessor, and others. In a typical IC, communications between circuit modules and/or circuits are limited due to the internal wired interconnections and communications between ICs are limited due to the external wired connections between them.

The limitations of internal IC interconnects and the IC-to-IC connections produce a silo effect of task execution (e.g., certain tasks are performed by certain circuits and/or modules of an IC). The silo effect inhibits efficient use of the device's IC resources resulting in uneven resource utilization between and within ICs. As wireless solutions evolve for resolving these issues, managing the wireless solutions will become an important issue.

Therefore, a need exists for a method and/or apparatus that provides wireless resource management that facilitates better utilization of IC resources.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 1 is a diagram of an example coverage area of one or more devices in accordance with the invention;

FIGS. 2A, 2B, 2C, and 2D are diagrams of examples of frequency spectrum use by one or more devices in accordance with the invention;

Figure 6:
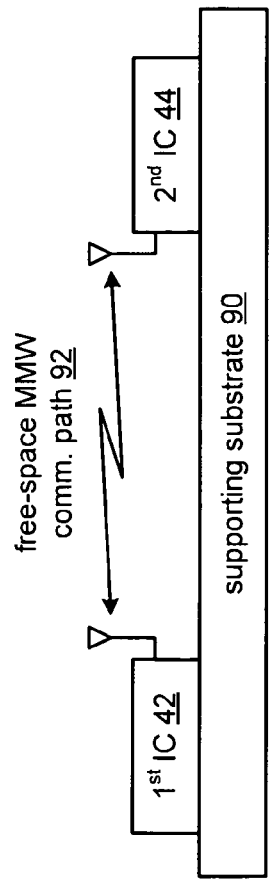
Figure 7:
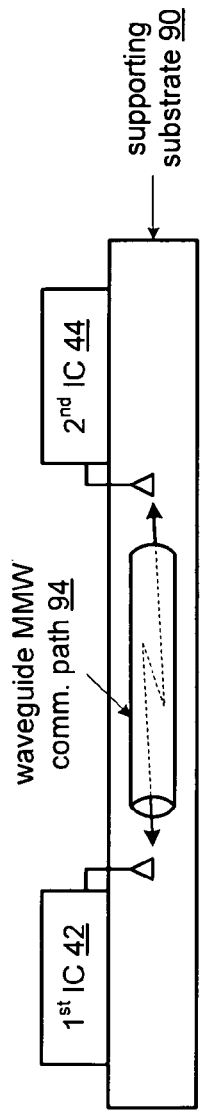
Figure 8:
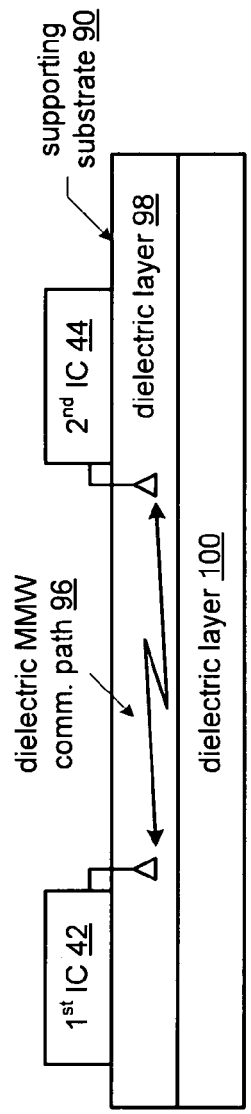
Figure 13:
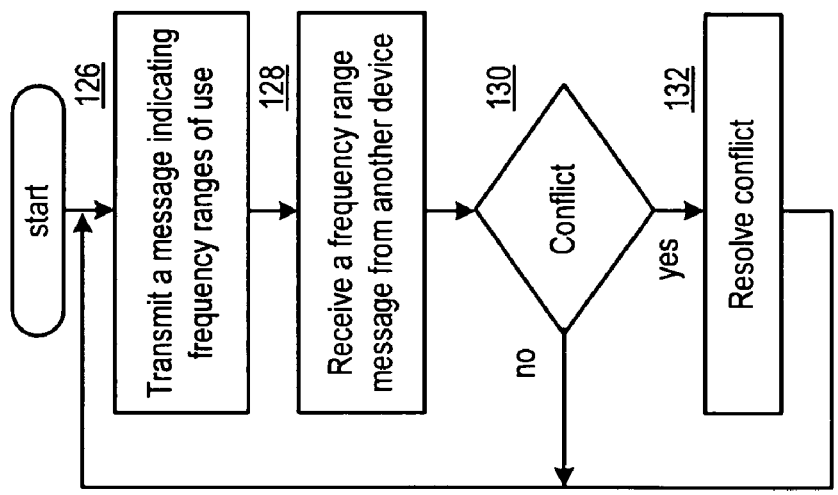
Figure 12:
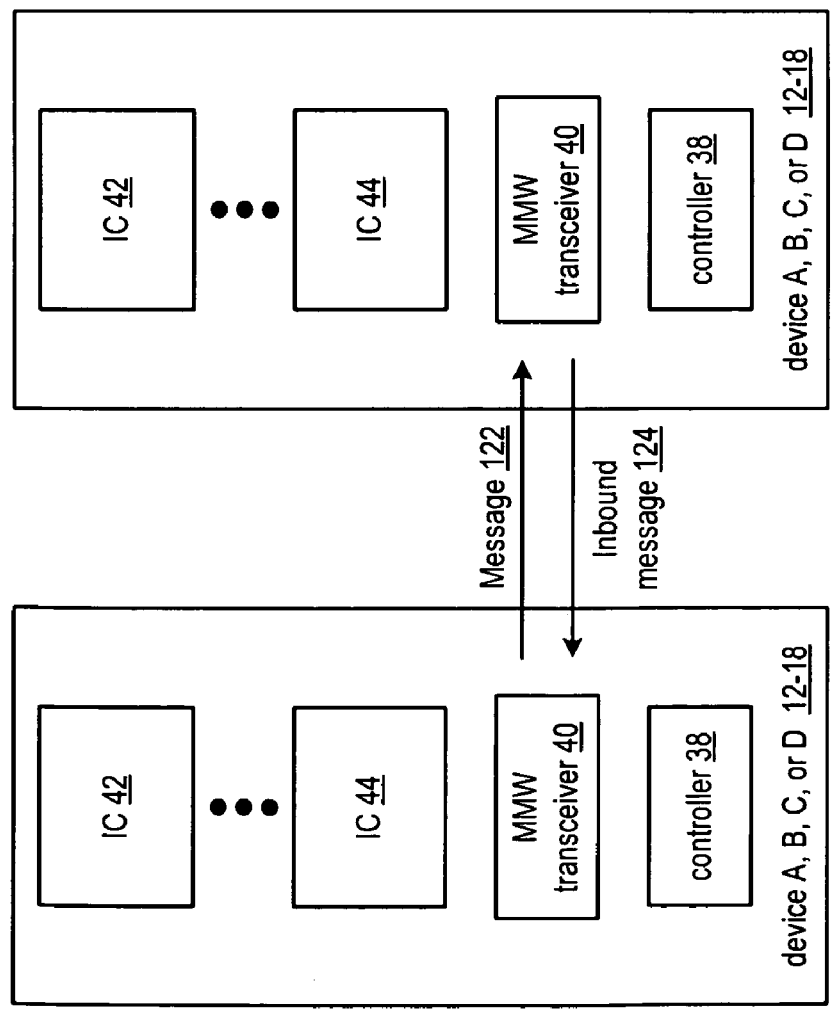
Figure 15:
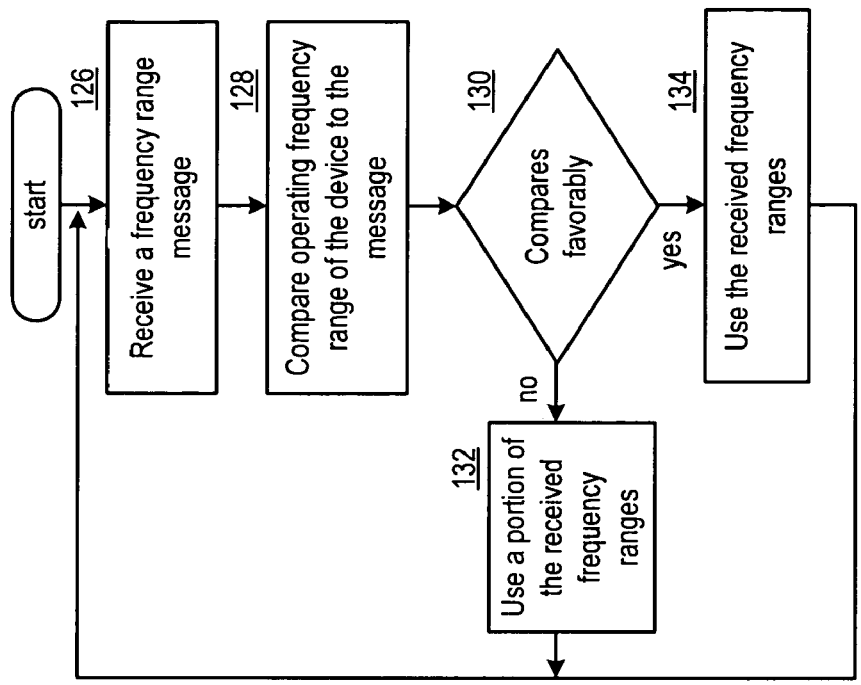
Figure 14:
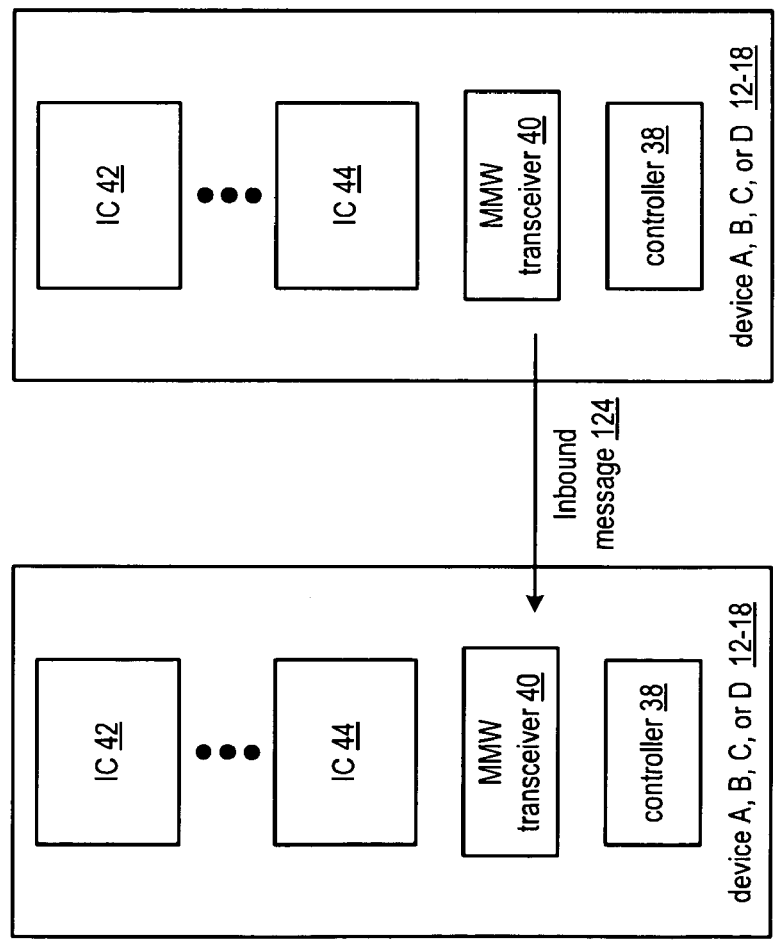
Figure 16:
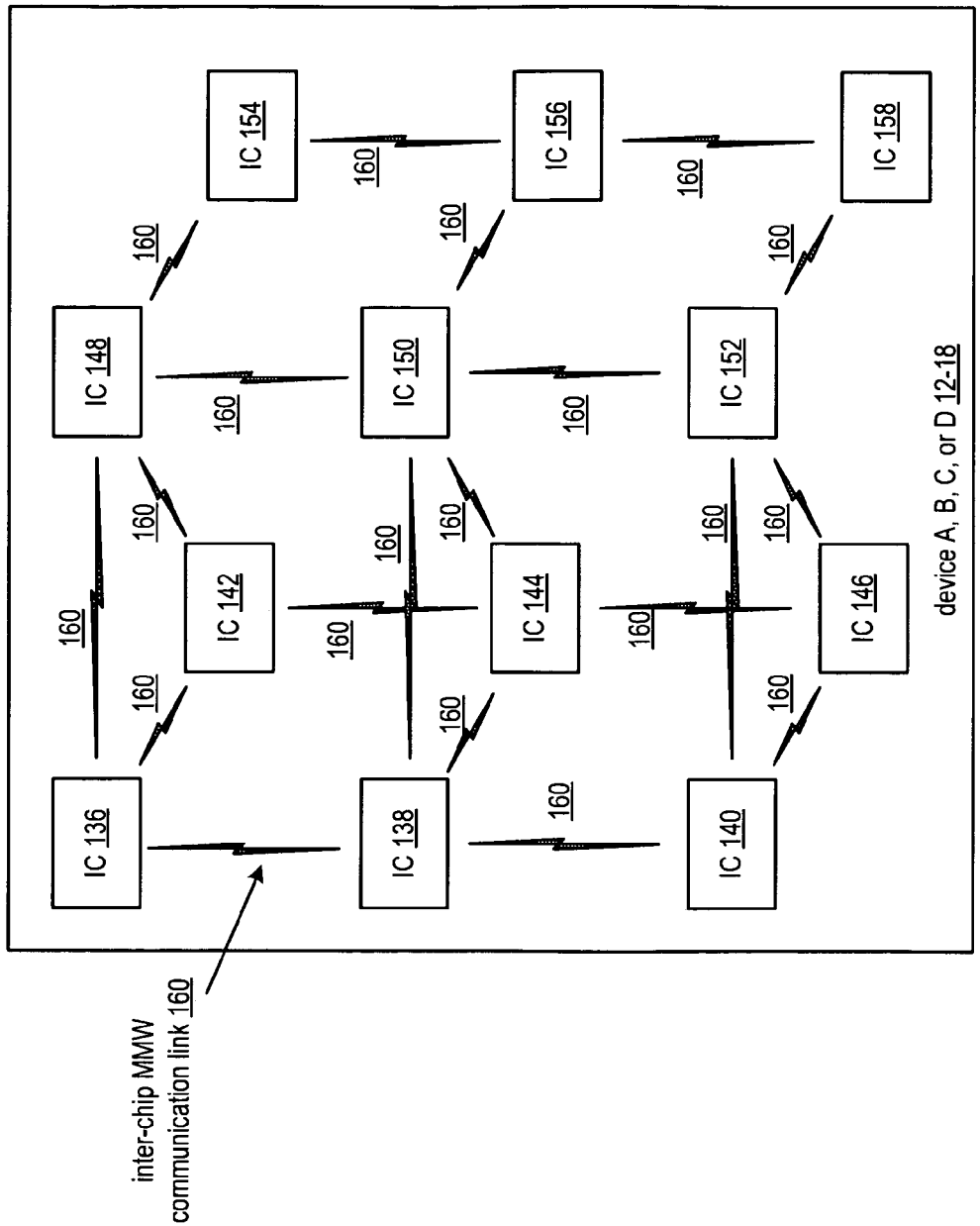
Figure 17:
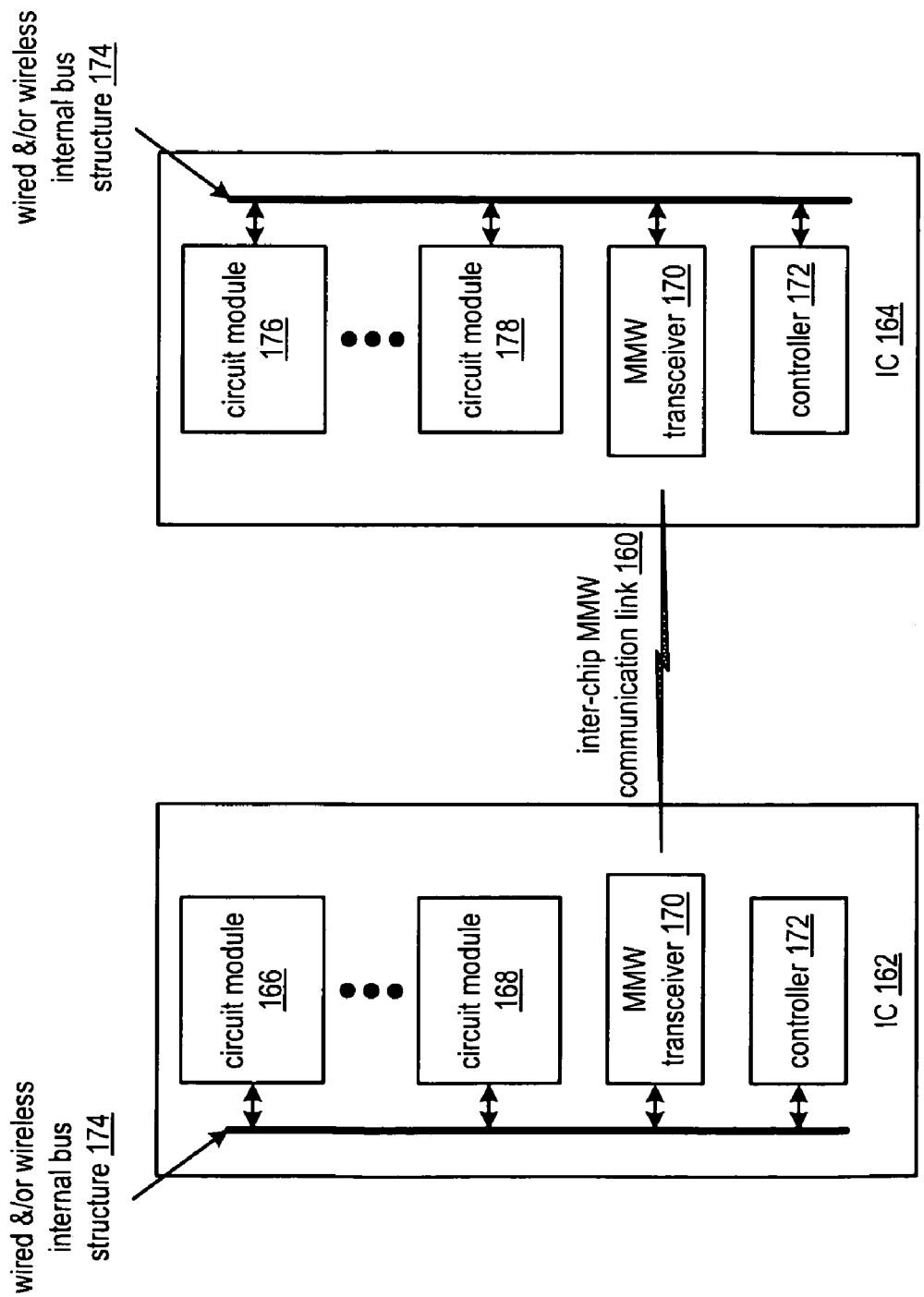
Figure 18:
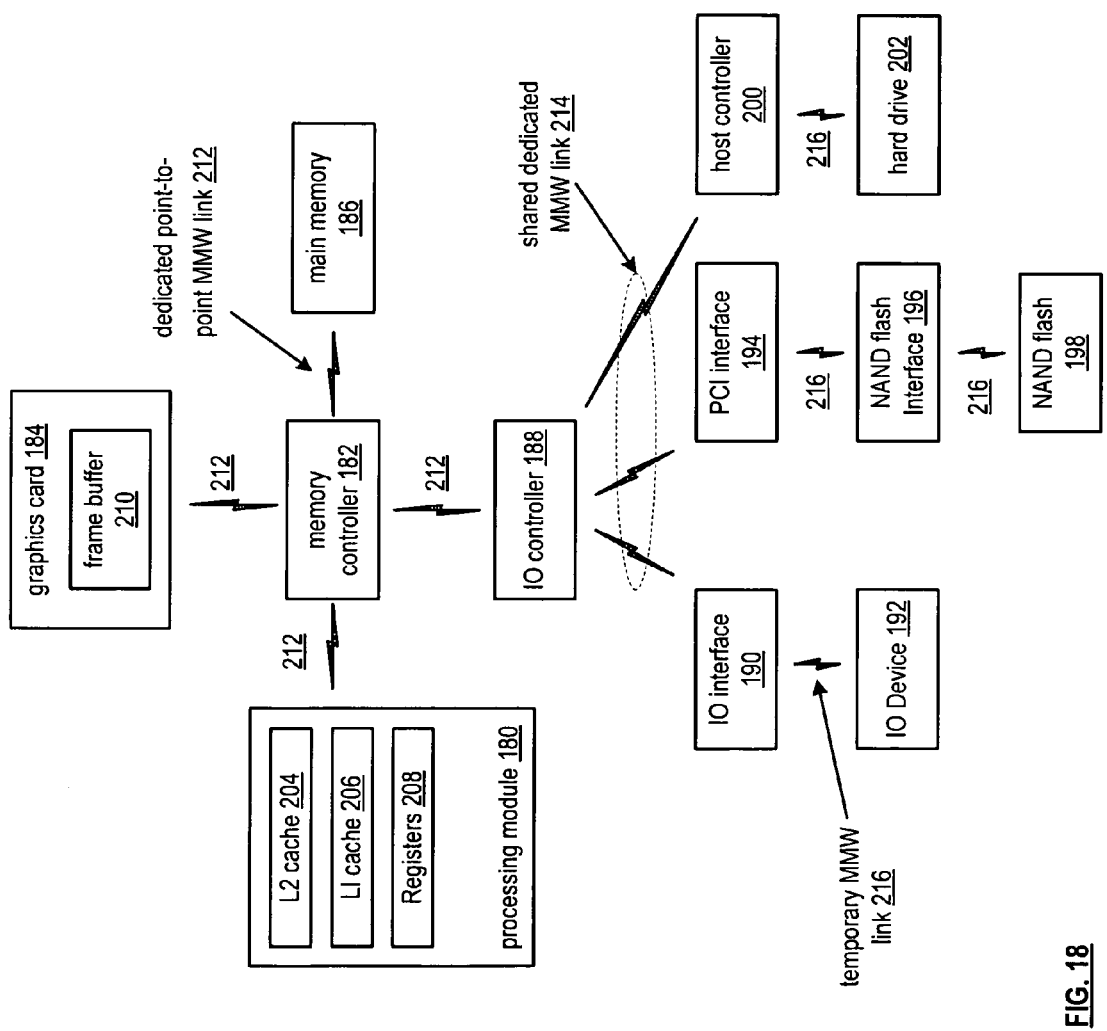
Figure 20:
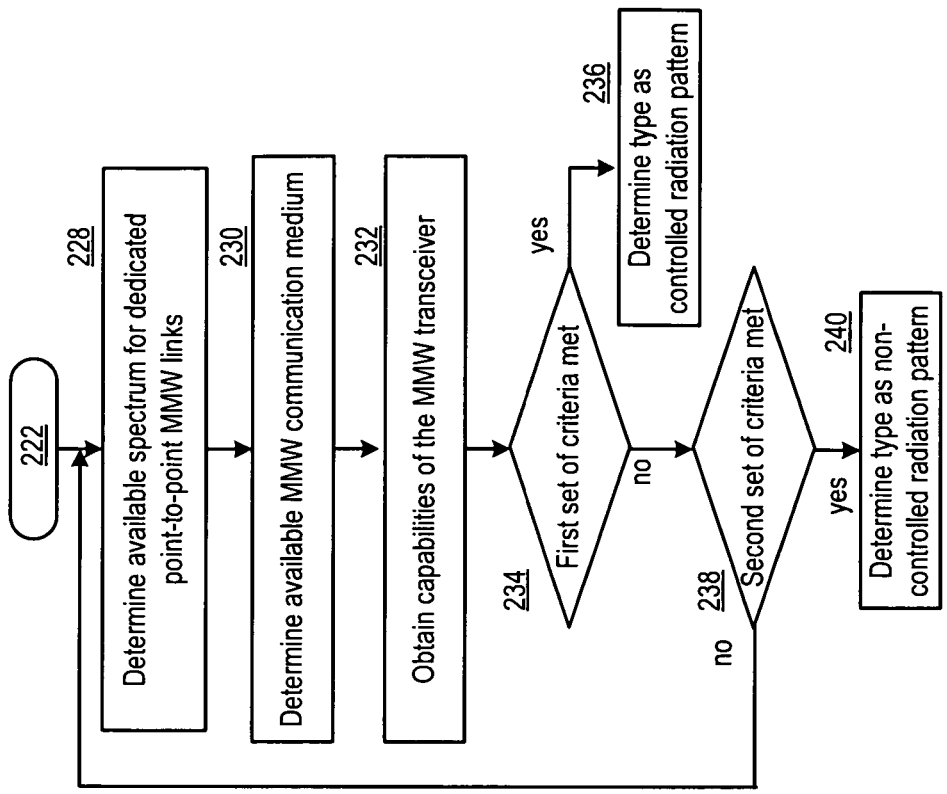
Figure 19:
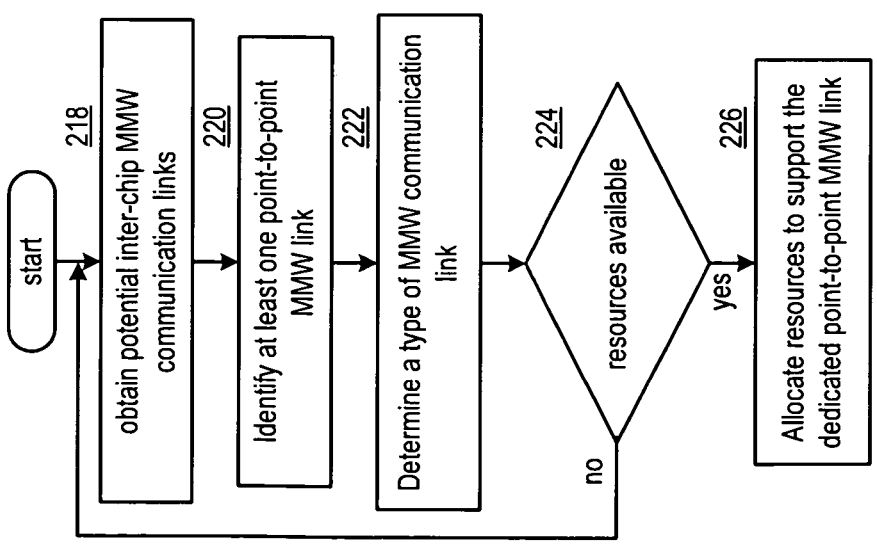
Figure 23:
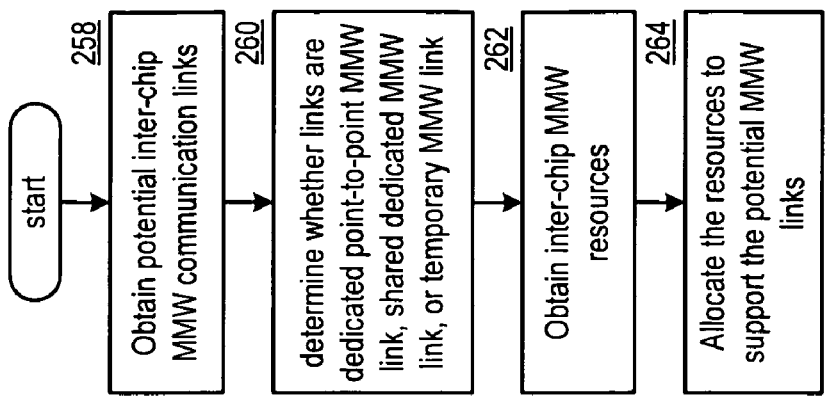
Figure 22:
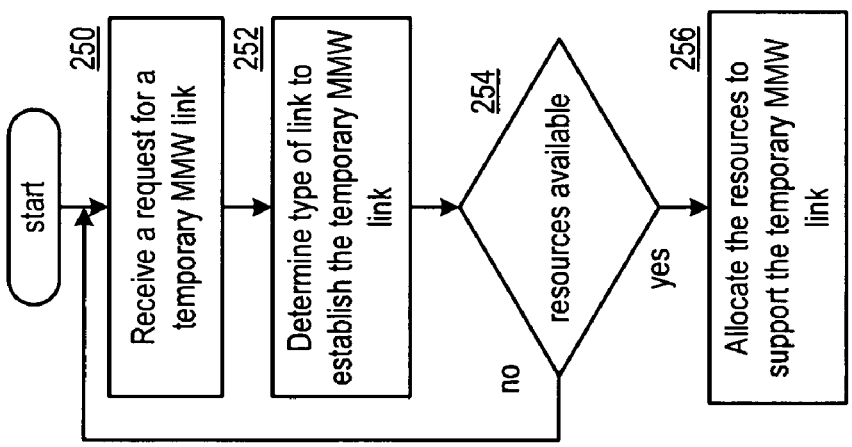
Figure 21:
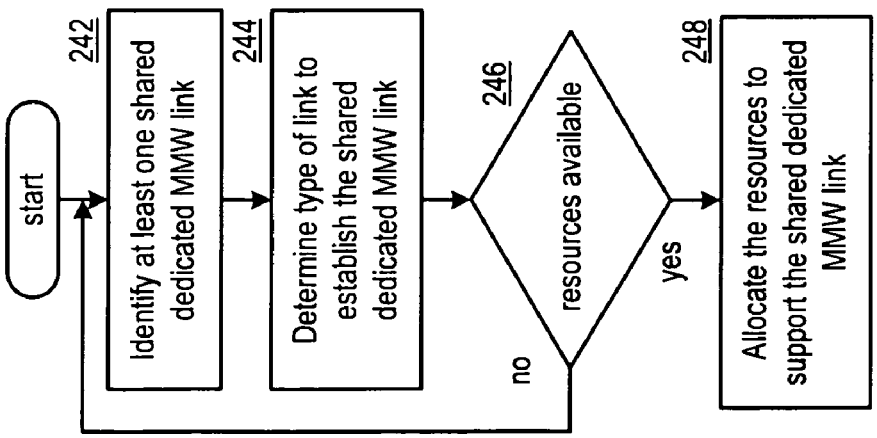
Figure 25:
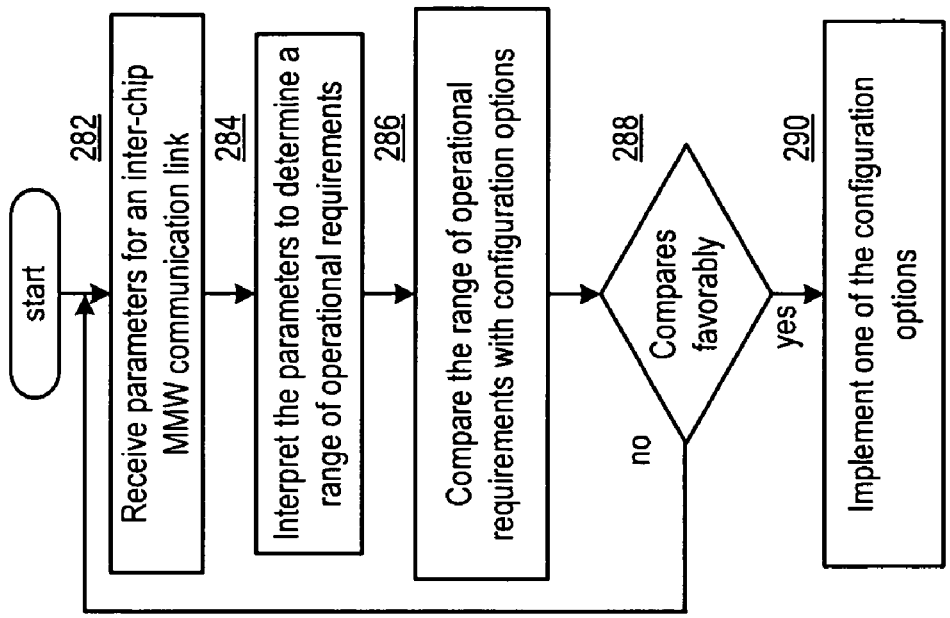
Figure 24:
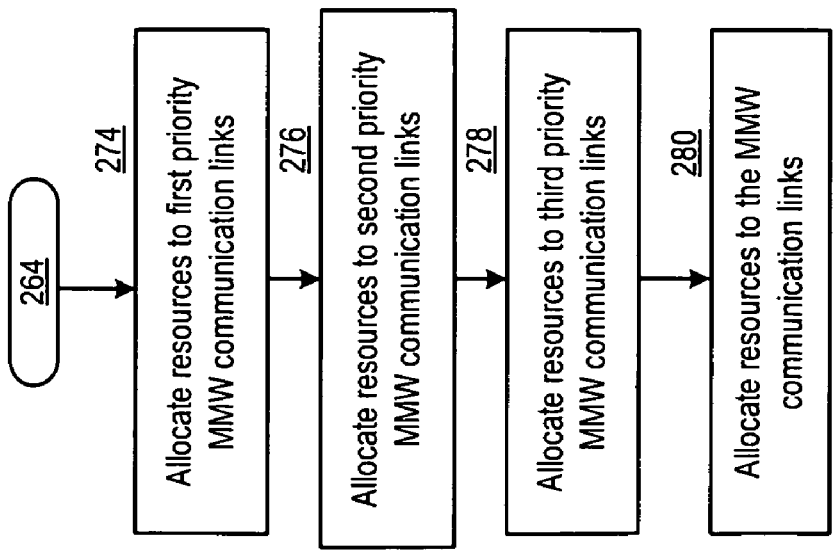
Figure 26:
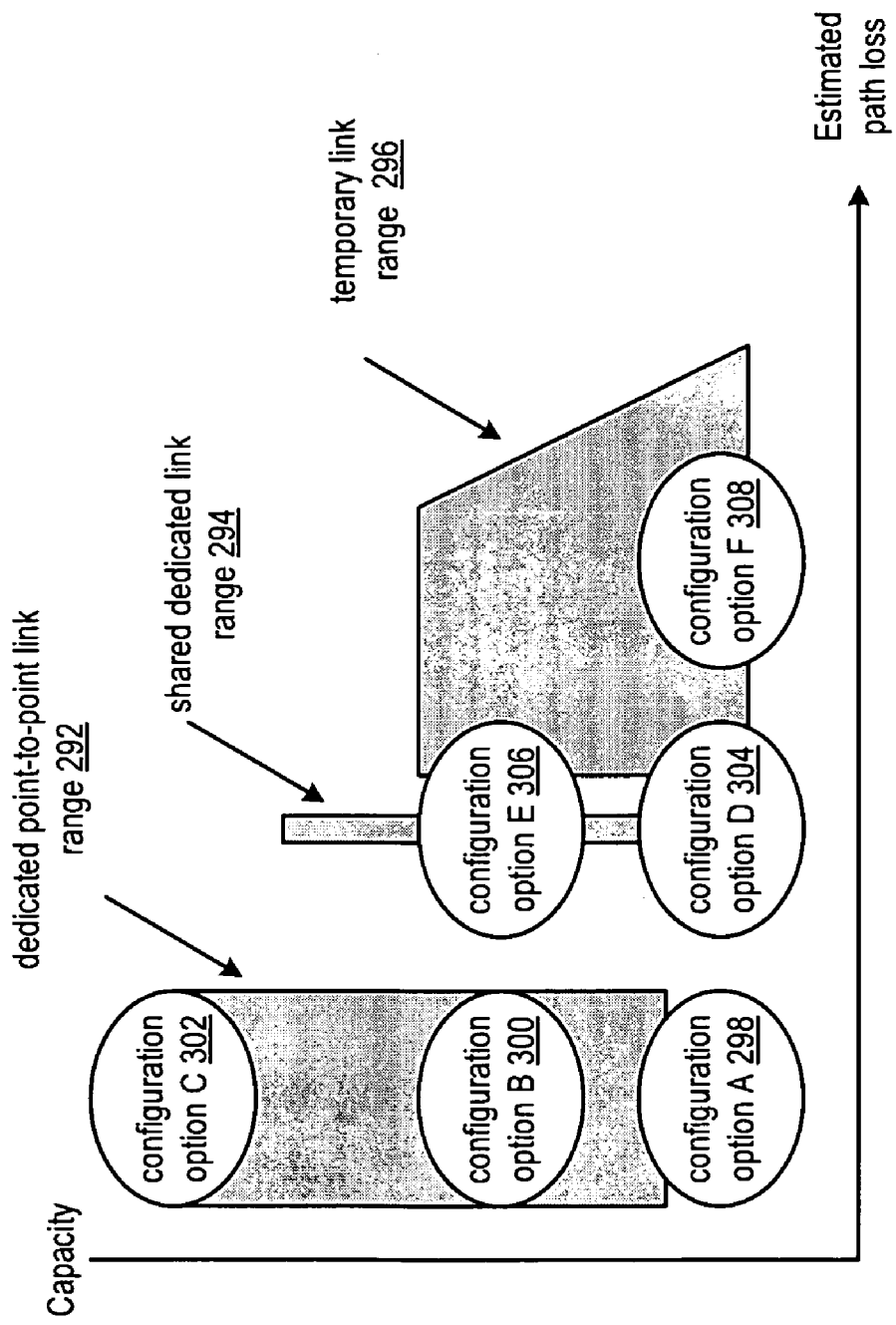
Figure 28:
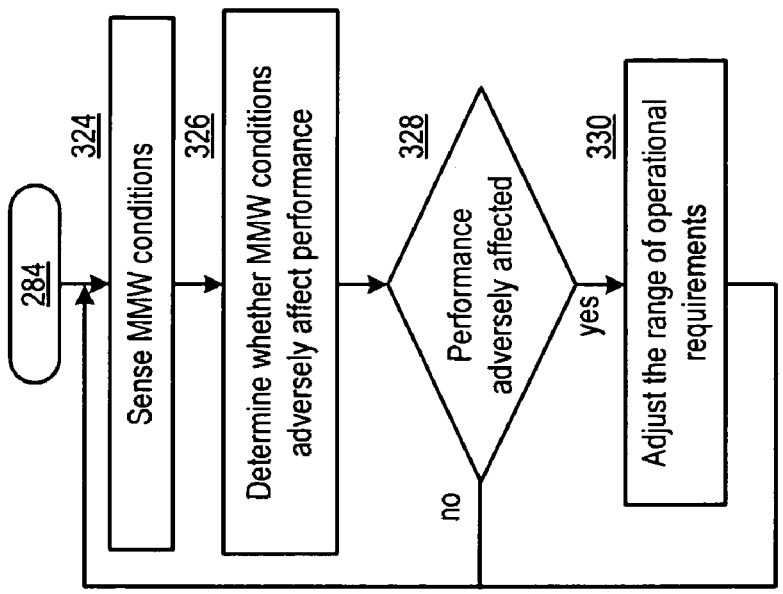
Figure 27:
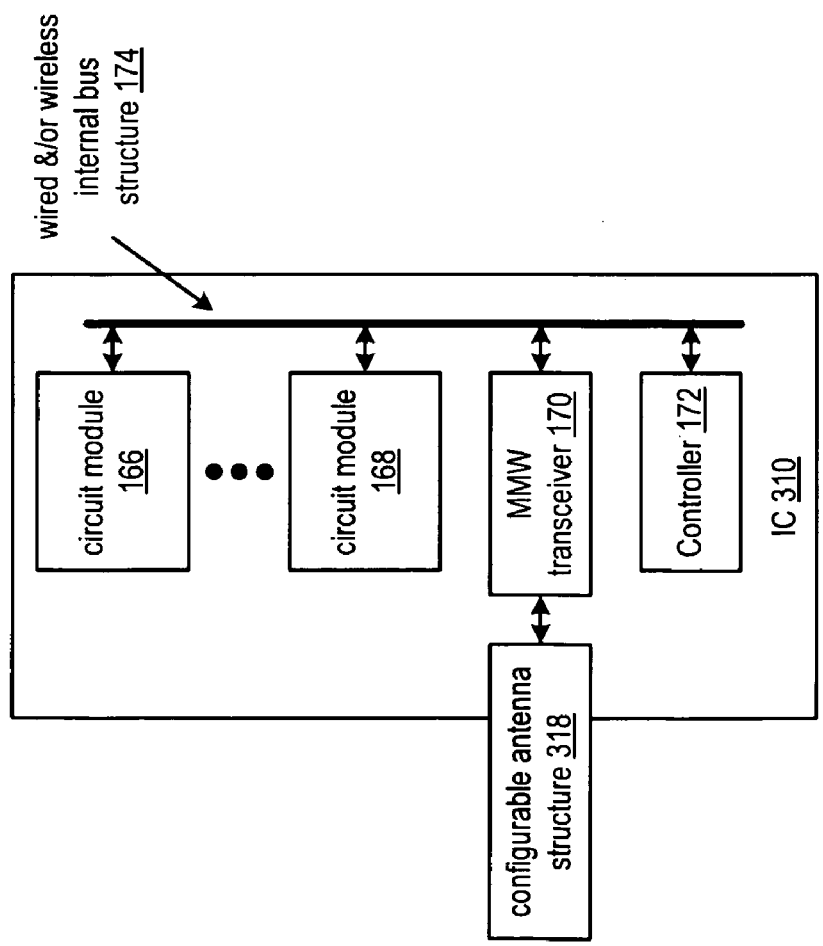
Figure 31:
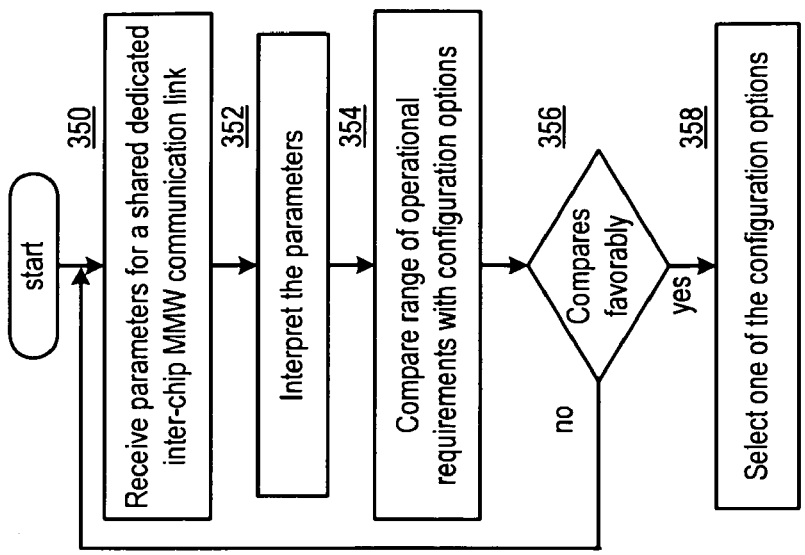
Figure 30:
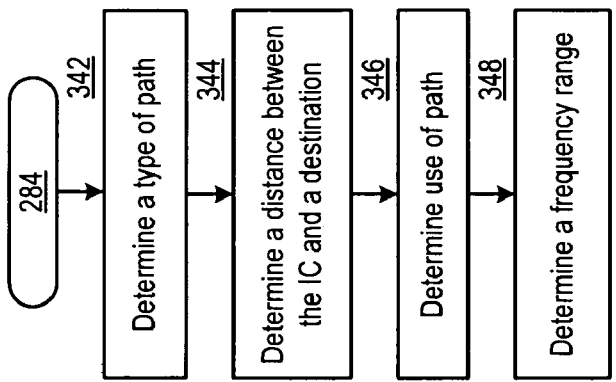
Figure 29:
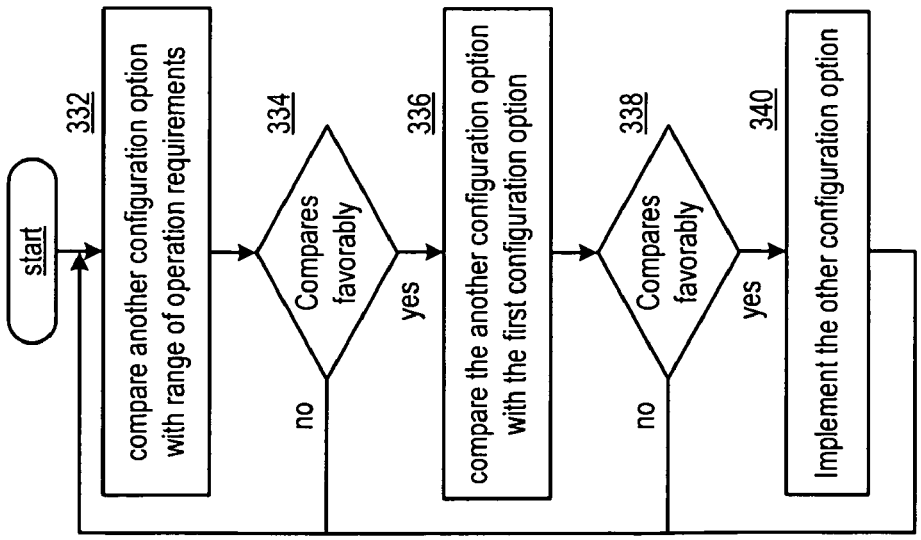
Figure 33:
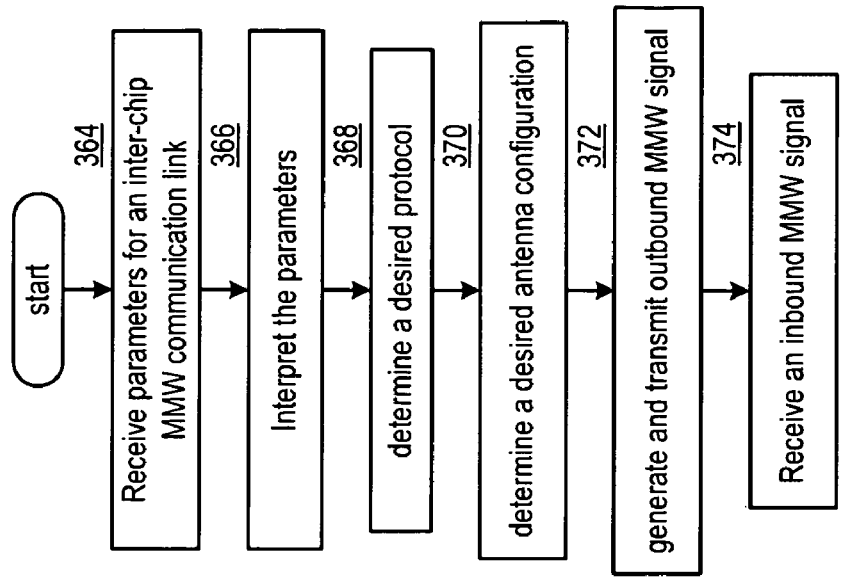
Figure 32:
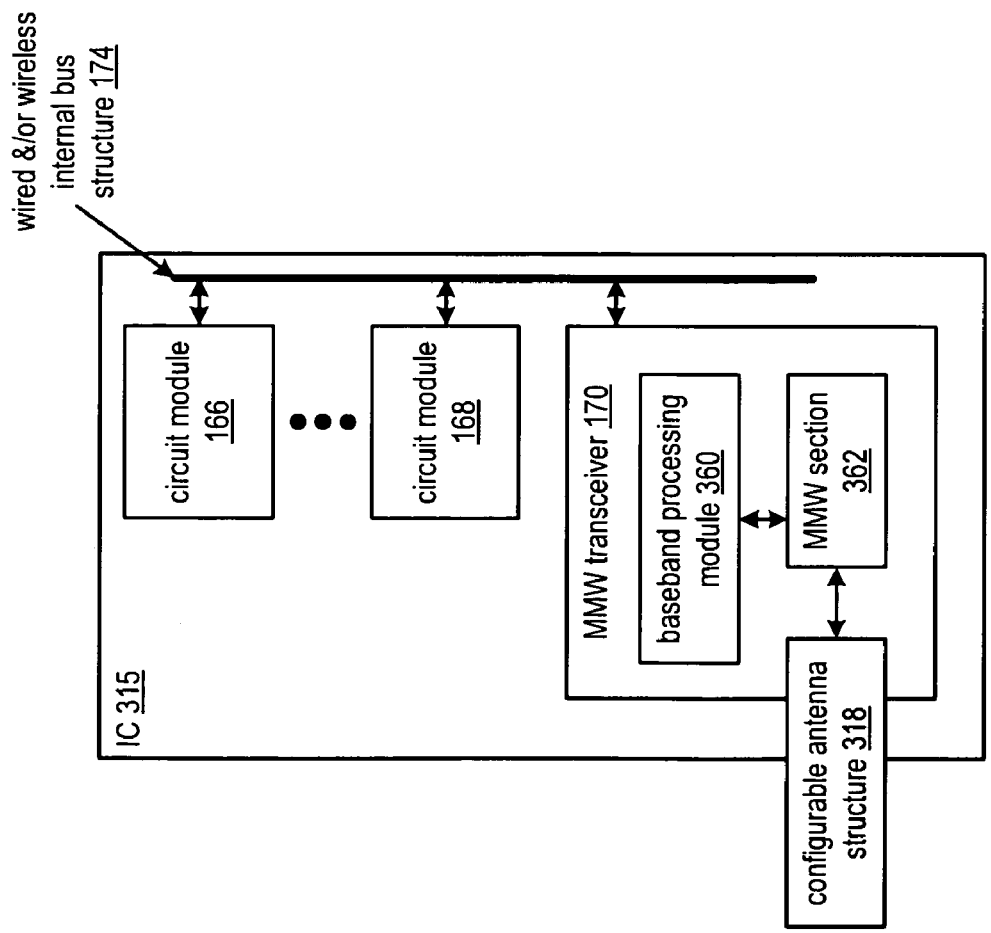
Figure 34:
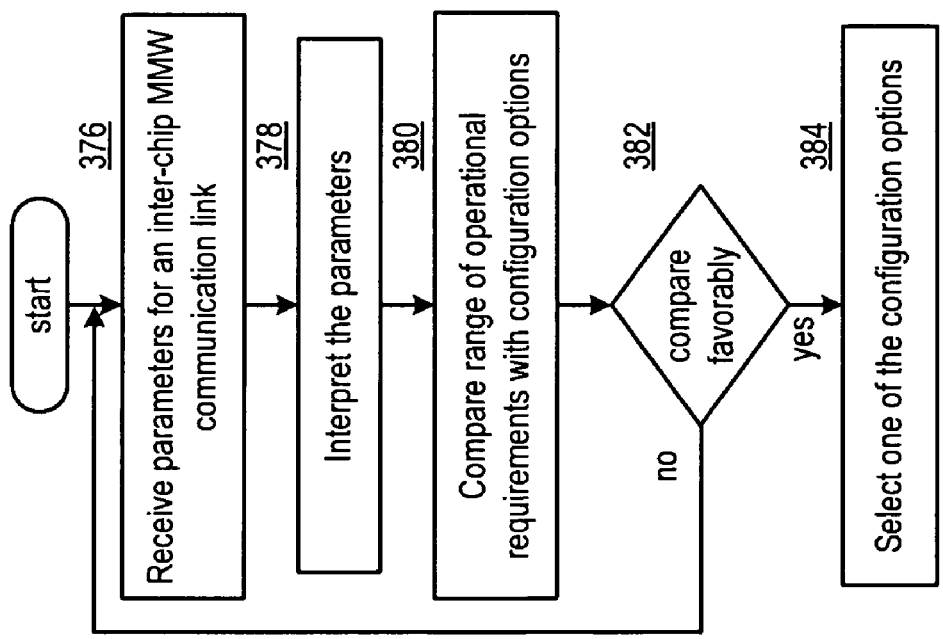

FIGS. 5A, 5B, and 5C are diagrams of examples of frequency use by one or more devices in accordance with the invention;

FIGS. 6-8 are diagrams of embodiments of intra-device millimeter wave communication links in accordance with the present invention;

FIG. 9 is a logic diagram of another embodiment of a method for managing frequency use in accordance with the invention;

FIG. 10 is a logic diagram of another embodiment of a method for managing frequency use in accordance with the invention;

FIG. 11 is a logic diagram of another embodiment of a method for managing frequency use in accordance with the invention;

FIG. 12 is a block diagram of an embodiment of communication between devices in accordance with the invention;

FIG. 13 is a logic diagram of another embodiment of a method for managing frequency use in accordance with the invention;

FIG. 14 is a block diagram of another embodiment of communication between devices in accordance with the invention;

FIG. 15 is a logic diagram of another embodiment of a method for managing frequency use in accordance with the invention;

FIG. 16 is a block diagram of another embodiment of a device in accordance with the invention;

FIG. 17 is a schematic block diagram of an embodiment of communication between integrated circuits in accordance with the invention;

FIG. 18 is a schematic block diagram of an embodiment of a device in accordance with the invention;

FIG. 19 is a logic diagram of an embodiment of a method for allocation of wireless resources in accordance with the invention;

FIG. 20 is a logic diagram of another embodiment of a method for allocation of wireless resources in accordance with the invention;

FIG. 21 is a logic diagram of another embodiment of a method for allocation of wireless resources in accordance with the invention;

FIG. 22 is a logic diagram of another embodiment of a method for allocation of wireless resources in accordance with the invention;

FIG. 23 is a logic diagram of another embodiment of a method for allocation of wireless resources in accordance with the invention;

FIG. 24 is a logic diagram of another embodiment of a method for allocation of wireless resources in accordance with the invention;

FIG. 25 is a logic diagram of an embodiment of a method for configuration of wireless operation in accordance with the invention;

FIG. 26 is a diagram of an example graph of range of operational requirements and configuration options in accordance with the invention;

FIG. 27 is a schematic block diagram of another embodiment of an integrated circuit in accordance with the invention;

FIG. 28 is a logic diagram of an embodiment of a method for configuration of wireless operation in accordance with the invention;

FIG. 29 is a logic diagram of another embodiment of a method for configuration of wireless operation in accordance with the invention;

FIG. 30 is a logic diagram of another embodiment of a method for configuration of wireless operation in accordance with the invention;

FIG. 31 is a logic diagram of another embodiment of a method for configuration of wireless operation in accordance with the invention;

FIG. 32 is a schematic block diagram of another embodiment of an integrated circuit in accordance with the invention;

FIG. 33 is a logic diagram of another embodiment of a method for configuration of wireless operation in accordance with the invention; and FIG. 34 is a logic diagram of another embodiment of a method for configuration of wireless operation in accordance with the invention.

DETAILED DESCRIPTION OF THE INVENTION

Figure 1:
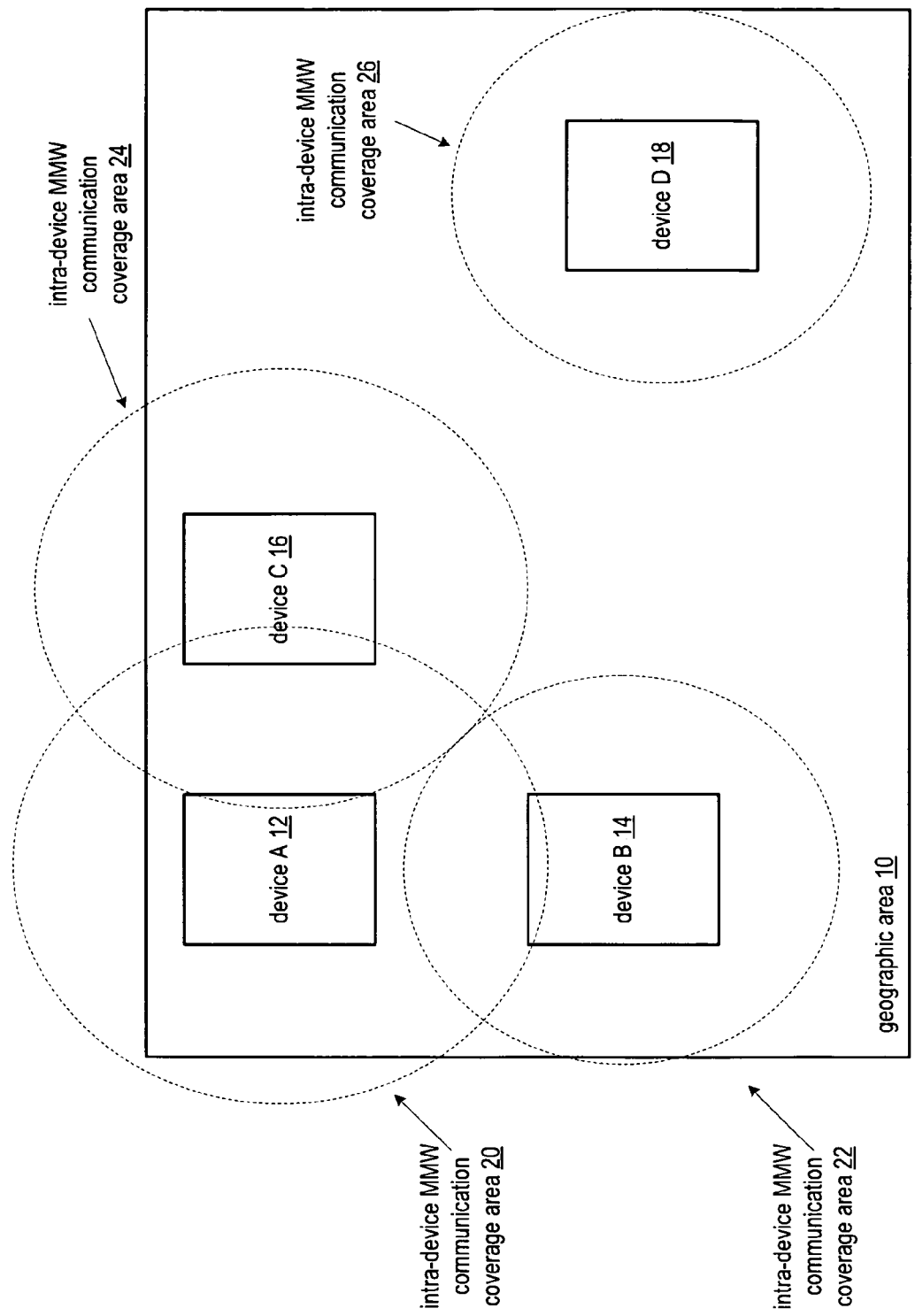

FIG. 1 is a diagram of an example intra-device millimeter wave (MMW) communication coverage area 20-26 of devices 12-18 within a geographic area 10. In this embodiment, the geographic area 10 may be a physically defined area (e.g., room, several rooms, a building, a home, etc.) in which the devices 12-18 are present or a non-physically defined area (e.g., outside, at public building, etc.) where the devices 12-18 are in close proximity (e.g. within a few meters of each other). For example, the geographic area 10 may describe the area of a vehicle, n parallel lanes of traffic m car-lengths long, a train car, a train, a room, a building floor, a building, a city block, a neighborhood, and/or any other space where one or more devices 12-18 may operate.

A device 12-18 may be a portable device or a fixed device. For example, a portable device may be a cell phone, a personal digital assistant, a digital music player, a digital video player, a laptop computer, a handheld computer, a video game controller, and/or any other portable equipment that includes integrated circuits. A fixed device may be a personal computer, a cable set-top box, a satellite receiver, a television set, a printer, a fax machine, home entertainment equipment, a video game console, and/or any type of home or office equipment that includes integrated circuits.

The intra-device MMW communication coverage areas 20-26 respectively define a three-dimensional radiation pattern that a device produces as a result of intra-device wireless communications. As will be described in greater detail below, an intra-device wireless communication is a MMW communication between components (e.g., integrated circuits, etc.) of the device, which may be conducted through the air or other medium. These communications produce the three-dimensional radiation pattern. Note that the coverage area 20-26 may be an irregular closed shape as a function of many parameters including use of directional antennas, proximity of the device to materials that absorb or reflect wireless signals, construction factors of the device, and/or any other factor that may impact the shape of a wireless coverage area.

If devices have overlapping coverage areas 20-26, there may be some device-to-device wireless interference of the intra-device wireless communications. For example, device A 12 has an intra-device MMW communication coverage area 20 that extends into the coverage area 22 of device B 14 and into the coverage area 24 of device C 16. In this instance, intra-device MMW communications of device A 12 and device B 14 may interfere with each other and intra-device MMW communications of device A 12 intra-device MMW communications of device C 16 may interfere with each other if the MMW communications use the same or similar frequencies. In this example, the intra-device MMW communications of device B and of device C are not expected to interfere with each other.

To resolve the potential interference between device A 12 and device B 14, one or both of the devices takes the lead to negotiate which frequencies to use for their respective intra-device MMW communications. For example, one of the devices (e.g., device A 12) may identify one or more other devices (e.g., device B 14) that have an intra-device MMW communication coverage area that overlaps with the intra-device MMW communication coverage area of the device. The device may then determine a first frequency range for use by the one or more other devices (e.g., device B 14) and the device (e.g., device A 12) for controlled radiation pattern intra-device MMW communications (e.g., MMW communications that transmitted via a medium that contains a substantial portion of antenna radiation). The device then coordinates allocation of a frequency use pattern to the one or more other devices and to the device for use for non-controlled radiation pattern intra-device MMW communications (e.g., MMW communications that transmitted via a medium that contains a substantial portion of antenna radiation.) In this manner, the potential for intra-device MMW communication interference between the devices is reduced.

To resolve the potential interference between device A 12 and device C 16, one or both of the devices takes the lead to negotiate which frequencies to use for their respective intra-device MMW communications. This may be done in a similar manner as device A 12 resolved the potential conflict with device B 14.

In this example, since device B 12 and device C 14 do not have overlapping coverage areas 22 ad 24, intra-device MMW communication interference is not expected; thus there is no need for the devices to directly negotiation frequency use. Nevertheless, since both devices B and C have overlapping coverage areas with device A and are thus relatively near each other (just not close enough to cause interference), it may be desirable for device A to coordinate the frequency use pattern to minimize potential interference between devices B and C.

As is further shown in this example, device D 18 has an intra-device MMW communication coverage area 26 that does not overlap with the coverage areas 20-24 of the other devices 12-16 in the geographic area 10. As such, the intra-device MMW communications of Device D 18 are not expected to interfere with the intra-device MMW communications of the other devices 12-16 if the same or similar frequencies are used for the MMW communications. As such, device D 18 may use any frequency within its available frequency spectrum for intra-device MMW communications.

Note that, as a device moves within the geographic area, the potential for intra-device MMW communication may change. As such, the coordination of frequency use pattern may be done periodically, randomly, continually, or upon detection of a triggering event (e.g., sensing radiation from other device). Further note that a device may enter or leave the geographic area 10 at any time, thus giving rise to a need to update the frequency use pattern.

FIGS. 2A, 2B, 2C, and 2D are diagrams of examples of frequency spectrum use by one or more devices 12-18. In particular, the diagrams indicate the frequency spectrum capabilities of the design of the MMW transceivers and/or the number of differing MMW transceivers. For instance, a MMW transceiver may be designed to function in the 56-64 GHz band, another may be designed to function in the 29 GHz band, another in the 80-100 GHz band, etc. As such, this capability may be a hardware limitation rather than a configuration (e.g., software/programmability) limitation. Further note that the MMW transceivers may be adjustable or wide bandwidth to operate over a wide MMW frequency spectrum 29-100 GHz. For example, device A has the capability to support the frequency spectrum from f1 to f5, device B has the capability to support the frequency spectrum from f2 to f6, etc. Thus, from device to device, their capability may vary, which varies the frequency spectrum over which they can function together.

For this example, FIG. 2A depicts the frequency spectrum of device A 12 for intra-device MMW communication 28 that extends from frequency f1 to frequency f5. FIG. 2D depicts the frequency spectrum of device D 18 for intra-device MMW communication 34 that also extends from frequency f1 to frequency f5. In this example, devices A and D have similarly capable MMW transceivers that are operable in the same frequency spectrum. If the communication coverage areas of device A 12 and D 18 overlap, and if non-controlled radiation patterns are used by either device, then the potential exists for interference between the intra-device MMW communications. If, however the communication coverage area 26 of device D 18 does not overlap with any other device, then utilizing the same overlapping frequency spectrum as any other device 12-16 may not cause interference.

In another example, FIG. 2B depicts the frequency spectrum of device B 14 for intra-device MMW communication 30 that extends from frequency f2 to frequency f6. In this example, the frequency spectrum of device B 14 overlaps with the frequency spectrum of device A 12 in the region from frequency f2 to frequency f5, but not from frequency f1 to frequency f2 and not from frequency f5 to frequency f6. If devices A and B have overlapping coverage areas 20-22, then the devices should negotiate to avoid using the same or similar frequencies within the overlapping frequency spectrum. For instance, device A 12 may use the spectrum from frequency f1 to frequency f2 and device B 14 may be limited to use the spectrum from frequency f5 to frequency f6 to avoid interference when non-controlled radiation patterns are used. In another instance, device A 12 may use some of the frequencies in the overlapping frequency range of f2 to f5 and device B 14 may use other frequencies in the overlapping frequency range for non-controlled radiation pattern MMW communications. In yet another instance, some or all of the frequency range f2 to f5 may be designated for controlled radiation pattern MMW communications by both devices.

In another example, FIG. 2C depicts the frequency spectrum of device C 16 for intra-device MMW communication 32 that extends from frequency f3 to frequency f4. In this example, the frequency spectrum of device C 16 overlaps with the frequency spectrum of device A 12 in the region from frequency f3 to frequency f4, but not from frequency f1 to frequency f3 and not from frequency f4 to frequency f5. If devices A and C have overlapping coverage areas 20 & 24, then the devices should negotiate to avoid using the same or similar frequencies in the overlapping frequency range of f3 to f4. For instance, device A 12 may be limited to use the spectrum from frequency f1 to frequency f3 and from frequency f4 to frequency f5, which device C uses the frequency spectrum from f3 to f4. In another instance, device A 12 may use some of the frequencies in the overlapping frequency range of f3 to f4 and device C 16 may use other frequencies in the overlapping frequency range for non-controlled radiation pattern MMW communications. In yet another instance, some or all of the frequency range f3 to f4 may be designated for controlled radiation pattern MMW communications by both devices.

Figure 3:
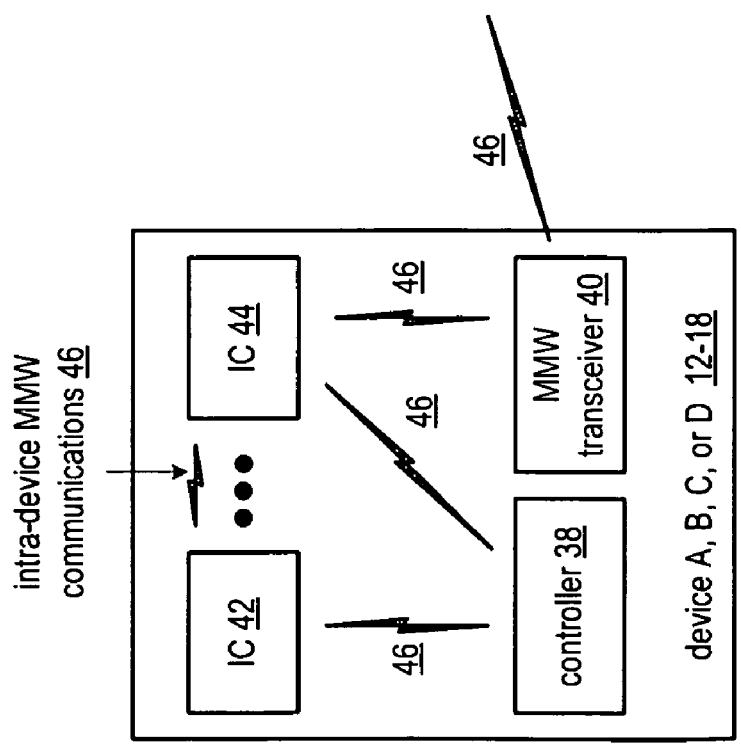
FIG. 3 is a block diagram of an embodiment of a device in accordance with the invention.

FIG. 3 is a block diagram of an embodiment of a device A, B, C, or D 12-18 that includes a controller 38, one or more MMW transceivers 40, and one or more ICs 42, 44. The one or more MMW transceivers 40 may be stand-alone devices coupled to the controller 38 and/or to the one or more ICs 42, 44 to support the intra-device MMW communications 46. Alternatively or in addition to, the ICs 42-44 and the controller 38 may each include one or more MMW transceivers to facilitate the intra-device MMW communications 46.

The controller 38 may be a microprocessor, microprocessor array, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The controller may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the controller implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Note that the controller may be a stand-alone IC or it may be distributed in one or more of the ICs 42-44.

The one or more ICs 42, 44 contain a plurality of resources and may include one or more processing resources and/or one or more memory resources. For example, IC 42 may include a processing resource and IC 44 may include a memory resource.

A processing resource may be a microprocessor, microprocessor array, micro-controller, digital signal processor, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing resource may have an associated memory and/or memory element, which may be a single memory device, a plurality of memory devices, and/or embedded circuitry of the processing resource. Such a memory device may be a read-only memory, random access memory, volatile memory, non-volatile memory, static memory, dynamic memory, flash memory, cache memory, and/or any device that stores digital information. Note that when the processing resource implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

A memory resource may be a read-only memory, random access memory, volatile memory, non-volatile memory, static memory, dynamic memory, flash memory, cache memory, and/or any device that stores digital information.

Figure 4:
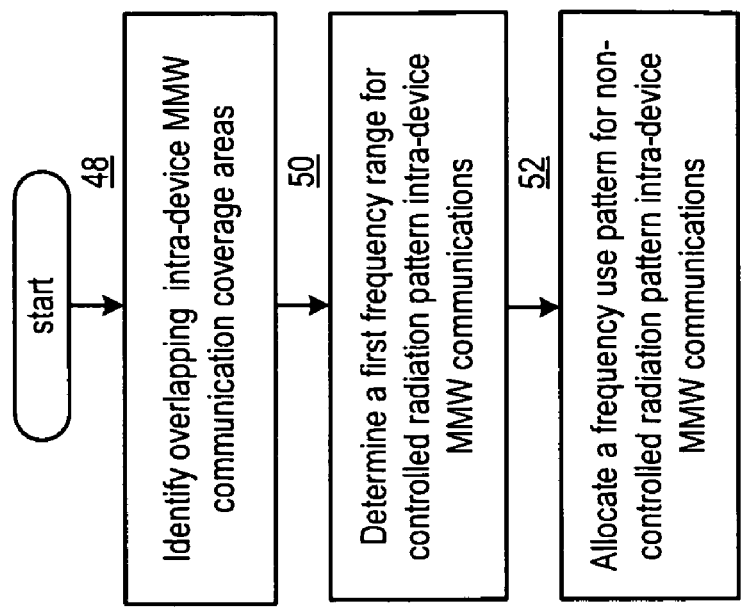
FIG. 4 is a logic diagram of an embodiment of a method for managing frequency use in accordance with the invention.

FIG. 4 is a logic diagram of an embodiment of a method for managing frequency use that begins at step 48 where the controller 38 identifies one or more other devices that have an intra-device MMW communication coverage area that overlaps with the intra-device MMW communication coverage area of the device. For example, controller 38 may attempt to communicate with one or more other devices by transmitting, via the MMW transceiver, an inquiry message requesting information regarding its intra-device MMW communications. If another device is in close enough proximity (e.g., within a few meters) to receive the inquiry message, it generates a response message indicating its intra-device MMW communication parameters (e.g., what frequencies it is using, what modulation schemes, transmit power levels, non-controlled radiation mediums being used, controlled-radiation mediums being used, etc.) and/or capabilities (e.g., what frequencies are within its frequency spectrum, what modulation schemes it can use, available transmit levels, available non-controlled radiation mediums, available controlled-radiation mediums, etc.). The controller 38 interprets the other device's response message to determine whether the intra-device MMW communication coverage area of the other device overlaps with the intra-device MMW communication coverage area of the device.

As another example, the controller 38 may listen, via the MMW transceiver 40, to MMW communications within the frequency spectrum of the device. The controller 38 interprets the MMW communications to identify the source and/or destination. When the controller 38 determines that the source or destination is not within its device, it determines that there is an overlapping coverage area of another device.

The method continues at step 50 where the controller 38 determines a first frequency range for use by the other device (s) and the device for controlled radiation pattern intra-device MMW communications. As will be discussed in greater detail with reference to FIGS. 7 and 8, a controlled radiation pattern intra-device MMW communication is one that occurs within a medium that substantially contains the radiated energy of the MMW signal therein. As such, there is negligible radiated energy of the MMW signal that leaves the device. In other words, this is very little potential for interference outside of the device.

The first frequency range may include high and low frequencies of one or more contiguous blocks of spectrum, a bandwidth, a center frequency, a channel size, a channel numbering scheme, a power spectral density limit, a channel access scheme (e.g., frequency division multiple access or FDMA, time division multiple access or TDMA), and/or any other operational MMW parameter for controlled radiation pattern intra-device MMW communications. In an example, the controller 38 may determine the first frequency range for device A 12 and device B 14 as frequency f2 to frequency f5 as depicted in FIGS. 2A and 2B since that range overlaps with the frequency spectrum of device A 12 and B 14. Containing the radiated energy of the MMW signals within the first frequency range allows both devices to use the frequencies within the first frequency range with substantially no interference.

The method continues at step 52 where the controller 38 coordinates allocation of a frequency use pattern to the other device(s) and to the device for non-controlled radiation pattern intra-device MMW communications. As will be described in greater detail with reference to FIG. 6, a non-controlled radiation pattern intra-device MMW communication is one that occurs within a medium (e.g., air) that does not substantially contain the radiated energy of the MMW signal therein. As such, there is radiated energy of the MMW signal that leaves the device. In other words, there is a potential for interference outside of the device.

The frequency use pattern is the potential allocation of frequencies within high and low frequencies of one or more contiguous blocks of spectrum, within a bandwidth, based on a center frequency, based on a channel size, based on a channel numbering scheme, based on a power spectral density limit, based on a geographic power limitation by frequency, based on a channel access scheme (e.g., frequency division multiple access or FDMA, time division multiple access or TDMA, code division multiple access), and/or based on any other operational MMW parameters for non-controlled radiation pattern intra-device MMW communications. In an example, the controller 38 determines a frequency use pattern for devices A and B of FIGS. 1, 2A and 2B where frequencies f1 to f2 are allocated to device A 12 for its non-controlled radiation pattern intra-device MMW communications and frequencies f5 to f6 are allocated to device B 14 for its non-controlled radiation pattern intra-device MMW communications.

In another example, the controller 38 determines a frequency use pattern where some to all of the frequencies within the overlapping frequency range of f2-f5 of FIGS. 2A and 2B are shared by devices A and B. For instance, the sharing may be done in an FDMA manner, a TDMA manner, frequency partitioning, etc. In general, the controller 38 determines the frequency use pattern for non-controlled radiation pattern intra-device MMW communications for both devices to minimize interference.

The controller 38 may communicate the allocation of the first frequency range and of the frequency use pattern to one or more of the ICs 42, 44 and to the other device(s) via one or more MMW transceivers. Note that the controller 38 may adjust the first frequency range and/or the frequency use pattern from time to time as the proximity of the devices changes and/or as another device enters into, and/or leaves, the proximity of the device.

FIGS. 5A, 5B, and 5C are diagrams of examples of frequency spectrum use by devices A 12, B 14, and C 16. The frequency spectrum for device A 12 for intra-device MMW communications 54 in FIG. 5A extends from f1 to f5. The frequency spectrum for device B 14 for intra-device MMW communications 56 in FIG. 5B extends from f2 to f6. The frequency spectrum for device C 16 for intra-device MMW communications 58 in FIG. 5C extends from f3 to f4. For these examples, the coverage areas of the three devices are as shown in FIG. 1. In particular, the intra-device MMW communications coverage area of device A overlaps the coverage area of device B 14 and also overlaps the coverage area of device C 16. The coverage areas of devices B 14 and C16 do not overlap.

FIG. 5A illustrates the frequency spectrum 54 for device A 12 that is divided into two sections: one for controlled radiation pattern MMW communications 60 (e.g., from f1 to f8) and the other for non-controlled radiation pattern MMW communications 66 (e.g., from f8 to f5).

FIG. 5B illustrates the frequency spectrum 56 for device B 14 that is divided into a controlled radiation pattern MMW communications 62 section (e.g., from f2 to f9) and a non-controlled radiation pattern MMW communications 68 section (e.g., from f9 to f6). FIG. 5C illustrates the frequency spectrum 58 for device C 16 that is divided into a controlled radiation pattern MMW communications 64 section (e.g., from f3 to f7) and a non-controlled radiation pattern MMW communications 70 section (e.g., from f7 to f4).

With simultaneous reference to FIGS. 5A-5C, a potential for interference (e.g., a conflict) arises when one of the devices' non-controlled radiation pattern MMW communications section overlaps, in frequency, another devices' controlled or non-controlled radiation pattern MMW communications section. For example, the frequency spectrum band between f8 and f9 in FIGS. 5A and 5B depicts a conflict 86 between device A 12 and device B 14 since device A's 12 non-controlled radiation pattern MMW communications section 66 overlaps device B's 14 controlled radiation pattern MMW communications section 62.

The conflict 86 indicates a potential for interference if device A transmits non-controlled radiation pattern MMW communications within the frequency spectrum of f8-f9. For instance, if device A transmits a non-controlled radiation pattern MMW communication within the frequency spectrum of f8-f9, device B may receive the MMW communication. If device B is also using the frequency spectrum of f8-f9 for a controlled radiation pattern MMW communication, the received MMW communication from device A may interference with device B's ability to accurately process its MMW communication. The degree of interference is dependent upon the power level at which device B received the MMW communication of device A. The larger the power level, the more likely it will adversely interfere with device B's MMW communication.

The conflict 86 may be avoided by restricting device A's and/or device B's use of the frequency spectrum of f8-f9. For example, the devices may agree that neither device will use the frequency spectrum of f8-f9; that only one of the devices will use the frequency spectrum of f8-f9; and/or that both devices will share the frequency spectrum f8-f9. The sharing may be done by time and/or frequency partitioning the frequency spectrum such that the overlap is substantially eliminated or that device A may use the frequency spectrum of f8-f9, but only for controlled radiation pattern MMW communications. The particular resolution of the conflict depends upon the size of the conflicting frequency spectrum (e.g., the narrower the conflicting frequency spectrum, the easier it is for one or both units to avoid using the frequency spectrum), the availability of other frequency spectrum, the availability of controlled radiation MMW communication medium, the level of intra-device MMW communications of the devices, etc.

Another conflict 78 (e.g., potential for interference) exists between devices A and B if both are using frequency spectrum f9-f5 for non-controlled radiation pattern MMW communications 66 and 68. The conflict 78 may be avoided by restricting device A's and/or device B's use of the frequency spectrum of f9-f5. For example, the devices may agree that neither device will use the frequency spectrum of f9-f5 (which, in this example, is not very practical since the frequency spectrum of f9-f5 is a majority of the spectrum available for non-controlled radiation MMW communications). As another example, the devices may agree that only one of the devices will use the frequency spectrum of f9-f5 (which, in this example is not very practical). As yet another example, the devices may agree to share the frequency spectrum f9-f5, which may be done by time and/or frequency partitioning the frequency spectrum such that the overlap is substantially eliminated. For instance, the devices may agree that device A will use a portion of the frequency spectrum of f9-f5 and device B will use another portion of the frequency spectrum of f9-f5. Alternatively, the devices may agree that device A will use the frequency spectrum of f9-f5 during particular times and device B will use the frequency spectrum of f9-f5 during different times (e.g., TDMA).

As is further shown, there are no conflicts 74, 70, and 82 between devices A and B. The non-conflicting 74 frequency spectrum of f1-f2 and the non-conflicting 82 frequency spectrum of f5-f6 exist because only one of the devices is using the frequency spectrum for intra-device communications. The non-conflicting 70 frequency spectrum of f1-f8 exists because both devices are using the frequency spectrum for controlled radiation pattern MMW communications, which produce negligible interference outside of the device.

Conflict 88 (e.g., potential for interference) exists between devices A and C within the frequency spectrum of f7-f8. Device A may be using this frequency spectrum for controlled radiation pattern MMW communications while device C may be using this frequency spectrum for non-controlled radiation pattern MMW communications. This conflict 88 is similar to conflict 86 between devices A and B and may be resolved in a similar manner.

Another conflict 80 exists between devices A and C within frequency spectrum f8-f4, where both devices may be using this frequency spectrum for non-controlled radiation pattern MMW communications. This conflict 80 is similar to conflict 78 between devices A and B and may be resolved in a similar manner. Note that devices A and C have non-conflicting frequency spectrum 76, 72, and 84.

FIG. 6 is a diagram of an embodiment of an intra-device MMW communication within one of the devices 12-18. The device includes a supporting substrate 90 that supports the ICs 42-44. Each IC is coupled to one or more antennas (e.g., omni directional, directional, vertically polarized, horizontally polarized, circular polarized). In this diagram, the antennas are shown external to the ICs, but, in another embodiment, an antenna may be at least partially within an IC.

The ICs 42-44 transceive intra-device MMW communications 46 via a free-space MMW communication path 92. In other words, the intra-device MMW communications 46 is conveyed via the air. Generally, the in-air MMW communications will be non-controlled radiation pattern intra-device MMW communications since the antenna radiation pattern is not substantially contained within the device. If, however, the devices are using directional antennas and/or beamforming such that the antenna radiation pattern is substantially contained with the device, then this type of in-air MMW communication could be a controlled radiation pattern MMW communication.

FIG. 7 is a diagram of another embodiment of an intra-device MMW communication within one of the devices 12-18. The device includes a supporting substrate 90 that supports the ICs 42-44 and a waveguide MMW communication path 94. Each IC is coupled to one or more antennas (e.g., omni directional, directional, vertically polarized, horizontally polarized, circular polarized). In this diagram, the antennas are shown external to the ICs, but, in another embodiment, an antenna may be at least partially within an IC.

The ICs 42-44 transceive intra-device MMW communications 46 via the waveguide MMW communication path 94, which may be formed in a micro-electromechanical (MEM) area of the supporting substrate 90. Such MMW communications are controlled radiation pattern intra-device MMW communications since the waveguide 94 substantially contains the radiated energy of the antennas such that little, if any, energy is radiated outside of the device.

FIG. 8 is a diagram of another embodiment of an intra-device MMW communication within one of the devices 12-18. The device includes a supporting substrate 90 that supports the ICs 42-44 and a dielectric MMW communication path 96. Each IC is coupled to one or more antennas (e.g., omni directional, directional, vertically polarized, horizontally polarized, circular polarized). In this diagram, the antennas are shown external to the ICs, but, in another embodiment, an antenna may be at least partially within an IC.

The ICs 42-44 transceive intra-device MMW communications 46 via the dielectric MMW communication path 96, which is provided by using different dielectric materials for dielectric layer 98 and dielectric layer 100 of the supporting substrate 90. Such MMW communications are controlled radiation pattern intra-device MMW communications since the dielectric communication path 96 substantially contains the radiated energy of the antennas such that little, if any, energy is radiated outside of the device.

While the examples of FIGS. 6-8 are shown separately, a device 12-18 will include multiple free-space MMW communication paths 92, waveguide MMW communication paths 94, and/or dielectric MMW communication paths 96 to support intra-device MMW communications 46. In this instance, the controller 38 selects an appropriate path for a given MMW communication based on one or more aspects of the intra-device MMW communication. For example, high data rate and/or non-error tolerant communications (e.g., operating system level communications) may occur over the waveguide MMW communication path 94, while lower data rate and/or error tolerant communications (e.g., some portions of application level communications) may occur over the free-space MMW communication path 92. As another example, the aspect on which the MMW communication path is selected may be user application defined, operating system level defined, and/or pre-programmed into the device. As yet another example, the aspect may correspond to the IC initiating an intra-device MMW communication and/or the IC receiving it. As a further example, the aspect may correspond to the number of intra-device MMW communications 46 an IC currently has active.

FIG. 9 is a logic diagram of another embodiment of a method for managing frequency use that further discusses step 48 of FIG. 4. The method begins at step 102 where the controller 38 generates an inquiry message requesting information regarding intra-device MMW communications. A purpose of the inquiry message is to solicit a response from one or more other devices within range of the device as those devices are the most likely devices that may cause interference to the device. The inquiry message may address all devices in the vicinity, just one device, or some other number of devices. When the message is prepared, it is sent to the MMW transceiver 40.

The method continues at step 104 where the MMW transceiver 40 transmits the inquiry message as a MMW outbound signal using a free-space MMW communication path (e.g., in air) at a sufficient power level to radiate outside of the device. In particular, the MMW transceiver converts the inquiry message into an outbound symbol stream, which is then converted into the MMW outbound signal. The MMW outbound signal will have a carrier frequency in accordance with the non-controlled radiation pattern intra-device MMW communication section of the frequency use pattern. The MMW transceiver may transmit the MMW outbound signal once at a given carrier frequency, may transmit the MMW outbound signal several times, may generate the MMW outbound signal at different carrier frequencies to effectively sweep the non-controlled radiation pattern intra-device MMW communication section, etc.

One or more other devices within range will receive the MMW outbound signal, convert it into the inquiry message, prepare a response message, convert the response message into a MMW response signal, and transmit the MMW response signal to the device. The response signal indicates information about the other device's intra-device MMW communications including the frequency use pattern (e.g., as shown in FIGS. 5A-5C), the amount of intra-devices MMW communications, the type of MMW communications (e.g., high data rate and/or non-error tolerant communications), mapping of intra-device communications (e.g., fixed or temporary communications and the resources allocated thereto), etc.

The method continues at step 106 where the MMW transceiver receives the response message indicating the other device's intra-device MMW communications. In this regard, the MMW transceiver receives the MMW response signal, converts it into a response symbol stream, and converts the symbol stream into the response message.

The method continues at step 108 where the controller 38 interprets the other device's intra-device MMW communications to determine whether the intra-device MMW communication coverage area of the other device overlaps with the intra-device MMW communication coverage area of the device. For example, the controller may determine the conflicts (e.g., potential for interference) between the two devices' frequency use patterns as discussed with reference to FIGS. 5A-5C.

FIG. 10 is a logic diagram of another embodiment of a method for managing frequency use that further discusses step 48 of FIG. 4. The method begins at step 110 where the controller 38 generates an inquiry message requesting a response. A purpose of the inquiry message is to solicit a response from one or more other devices within range of the device as those devices are the most likely devices that may cause interference to the device. The inquiry message may address all devices in the vicinity, just one device, or some other number of devices. When the message is prepared, it is sent to the MMW transceiver 40.

The method continues at step 112 where the MMW transceiver 40 repeatedly transmits the inquiry message as a MMW outbound signal sequentially using a plurality of intra-device MMW communication channels. For example, the plurality of intra-device MMW communication channels corresponds to a plurality of frequencies within the frequency spectrum of the device. For instance, if the frequency spectrum is from 60 GHz to 80 GHz, there may be channels at intervals of 1 GHz, yielding 21 channels. Thus, the MMW transceiver adjusts its transmitter section to transmit the MMW outbound signal at each of the 21 channels.

The method continues at step 114 where the MMW transceiver receives a response message via one or more of intra-device MMW communication channels. For example, another device may receive the MMW outbound signal on multiple channels. The other device may respond on any one of, some of, or all of the channels on which it received the MMW outbound signal.

The method continues at step 116 where the controller 38 interprets the response message to determine the other device's intra-device MMW communications. From this, the controller determines whether the intra-device MMW communication coverage area of the other device conflicts (e.g., potential for interference) with the intra-device MMW communication coverage area of the device. For example, the controller may determine the conflicts between the two devices' frequency use patterns as discussed with reference to FIGS. 5A-5C.

FIG. 11 is a logic diagram of another embodiment of a method for managing frequency use that further discusses step 48 of FIG. 4. The method begins at step 118 where the MMW transceiver repeatedly adjusts its operating frequency to sequentially receive a message from a plurality of intra-device MMW communication channels to produce a plurality of received messages. For example, the plurality of intra-device MMW communication channels corresponds to a plurality of frequencies within the frequency spectrum of the device. For instance, if the frequency spectrum is from 60 GHz to 80 GHz, there may be channels at intervals of 1 GHz, yielding 21 channels. Thus, the MMW transceiver adjusts its receiver section to be able to receive the message (e.g., a MMW inbound signal) at each of the 21 channels.

The method continues at step 120 where the controller 38 determines whether a conflict exists for a channel of the plurality of intra-device MMW communication channels based on the plurality of received messages. The message may not explicitly contain the frequency use pattern of the other device so the device must deduce what it can to determine the conflict. For example, the controller 38 may list the frequency use of the other devices it received a message on and assume that FDMA channel access is being used such that all the frequencies on the list are potential interferers. In another example, FDMA is assumed, the same list of frequencies where messages were received is kept, but frequencies are dropped off the list if activity has not been detected within the last unit of time. The unit of time can be preprogrammed, auto-adaptive as a function of the history of the average time period between received messages, or determined in another way to keep the list current. In yet another example, the same list of frequencies where messages were received is kept, but for each frequency the controller 38 determines if it is being used in a TDMA fashion. If a channel is being used in a TDMA fashion, the controller 38 determines if it can use the channel too in a TDMA fashion. To determine the TDMA scheme, the device monitors a given channel for a time period sufficient to observe other potential TDMA participating devices and determine the timing of the TDMA scheme therefrom. If the controller 38 cannot determine and use the TDMA scheme, then that frequency will be flagged as an interferer.

FIG. 12 is a block diagram of another embodiment of two devices A, B, C, and/or D 12-18 communicating with each other. Each of the devices 12-18 includes a controller 38, a MMW transceiver 40, and one or more ICs 42, 44.

In an example of operation, controller 38 of a first device sends a message to its MMW transceiver 40, which produces therefrom a MMW message 122. The message 122 indicates a first frequency range that the device is using for controlled radiation pattern intra-device MMW communications and a second frequency range that the device is using for non-controlled radiation pattern intra-device MMW communications. The message 122 may be transmitted via a channel (e.g., at a frequency) within the non-controlled radiation pattern intra-device MMW communications section or using a designed channel for inter-device communications.

The second device receives the message 122 via its MMW transceiver, which recovers the message. The controller of the second device interprets the message to extract the first frequency range information and the second frequency range information. The second device may then compose its own message 124 regarding its controlled and non-controlled radiation pattern frequency range information, which is transmitted to the first device. The controller of the first device extracts the controlled and non-controlled radiation pattern frequency range information from the message.

The controller of the first device then compares the non-controlled radiation pattern frequency range information of the other device with its second frequency range (e.g., its non-controlled radiation pattern frequency range). If the comparison is unfavorable, the controller executes a frequency conflict resolution algorithm.

In an embodiment, the frequency conflict resolution algorithm includes identifying at least one frequency of the non-controlled frequency range and flagging the at least one frequency as having a conflict. For example, if the devices have a frequency overlap of their non-controlled radiation pattern MMW communication frequency spectrums, then the frequencies in the overlapping area are flagged as having a conflict, which may be resolved by sharing the frequency, by allowing one device to use the frequency, and/or by both devices not using the frequency. An example of a conflict was provided with reference to FIGS. 5A-5C.

In another embodiment, the frequency conflict resolution algorithm includes identifying at least one frequency of the non-controlled frequency range. The controller then generates a message indicating use of the at least one frequency. For example, the controller may indicate that its device will use the frequency. The controller then flags the frequency as available and provides a message to the other device that it is using the frequency.

In a further embodiment, the controller may compare the first frequency range of its device (i.e., its controlled radiation frequency range) with the controlled radiation frequency range of the other device. The controller may adjust the first frequency range when the comparison was unfavorable. The amount of adjust is such that the first frequency range of the device will compare favorably with the controlled radiation frequency range of the other device. For example, if the devices are using different frequency ranges for their controlled radiation pattern MMW communications, one or both of the devices adjusts its range such that both ranges are the substantially same.

In yet another embodiment, the controller may compare the first frequency range of its device (i.e., its controlled radiation frequency range) with the controlled radiation frequency range of the other device. The controller may execute a controlled radiation frequency conflict resolution algorithm when the comparison was unfavorable. For example, the controlled radiation frequency conflicts resolution algorithm may include identifying at least one frequency of the non-controlled frequency range and flagging the at least one frequency as having a conflict. The controller then transmits, via the MMW transceiver, a message to the other device, wherein the message indicates that the at least one frequency should not be used by the other device. As another example, the controlled radiation frequency conflicts resolution algorithm may include identifying at least one frequency of the non-controlled frequency range. The controller then transmits, via the MMW transceiver, a message identifying the at least one frequency to the other device. The controller then receives, via the MMW transceiver, a message whether the other device is requesting use of the at least one frequency or releasing use of the at least one frequency.

In still another embodiment, the controller may compare the second frequency range of its device (i.e., its non-controlled radiation frequency range) with the controlled radiation frequency range of the other device. The controller may execute a controlled radiation frequency conflict resolution algorithm when the comparison was unfavorable. In an embodiment, the controlled radiation frequency conflicts resolution algorithm may include identifying at least one frequency of its non-controlled frequency range and flagging it as having a conflict. For example, the controlled radiation frequency conflicts resolution algorithm may include identifying at least one frequency of the non-controlled frequency range. The controller then changes the frequency from the non-controlled frequency range to the controlled frequency range (e.g., from the second frequency range to the first).

FIG. 13 is a logic diagram of another embodiment of a method for managing frequency use that begins at step 126 where the controller 38 of the device 36 forms a message 122 for transmission by MMW transceiver 40. The message indicates a first frequency range that the device is using for controlled radiation pattern intra-device MMW communications and a second frequency range that the device is using for non-controlled radiation pattern intra-device MMW communications.

The method continues at step 128 where an inbound message 124 from another device is received by the MMW transceiver 40 and provided to the controller 38. The controller processes the inbound message to extract a controlled radiation frequency range that the other device is using for its controlled radiation pattern intra-device MMW communications and a non-controlled frequency range that the other device is using for its non-controlled radiation pattern intra-device MMW communications.

The method continues at step 130 where the controller 38 compares the non-controlled frequency range with the second frequency range of the device (e.g., compares the frequency ranges of both devices being used for non-controlled radiation pattern MMW communications). An unfavorable comparison may indicate that a conflict exists between the two frequency ranges. An example of this was discussed with reference to FIGS. 5A-5C. If the comparison is favorable (e.g., no conflict is detected), then the process repeats at step 126.

If the comparison is unfavorable (e.g., at least one conflict is detected) then the process continues at step 132. At step 132, the controller executes a frequency conflict resolution algorithm. Examples of the frequency conflict resolution algorithm were provided with reference to FIG. 12.

FIG. 14 is a block diagram of another embodiment of two devices A, B, C, and/or D 12-18 communicating with each other. Each of the devices 12-18 includes a controller 38, a MMW transceiver 40, and one or more ICs 42, 44. In this embodiment, the controller is operably coupled to receive, via the MMW transceiver, an inbound message from another device. The inbound message indicates a controlled radiation frequency range for controlled radiation pattern intra-device MMW communications and a non-controlled frequency range for non-controlled radiation pattern intra-device MMW communications. As such, the other device is broadcasting its controlled and non-controlled radiation frequency range information.

After receiving the information, the controller compares the operating frequency range of its device with the controlled radiation frequency range and the non-controlled frequency range. If the comparison is favorable, the controller coordinates use of the controlled radiation frequency range for the controlled radiation pattern intra-device MMW communications of the device and use of the non-controlled frequency range for the non-controlled radiation pattern intra-device MMW communications of the device. If the comparison is unfavorable, the controller adjusts its controlled and/or non-controlled radiation frequency ranges to avoid a conflict with the frequency ranges of the other device.

FIG. 15 is a logic diagram of a method for frequency use management that begins at step 126 where a controller (e.g., 38 as shown in FIG. 14) receives, via the MMW transceiver, an inbound message from another device. The inbound message indicates a controlled radiation frequency range for controlled radiation pattern intra-device MMW communications and a non-controlled frequency range for non-controlled radiation pattern intra-device MMW communications. As such, the other device is broadcasting its controlled and non-controlled radiation frequency range information.

The method continues at step 128 where the controller compares the operating frequency range of its device with the controlled radiation frequency range and the non-controlled frequency range. The method branches at step 130 to step 134 when the comparison is favorable and to step 132 when the comparison is not favorable. At step 134, the controller coordinates use of the controlled radiation frequency range for the controlled radiation pattern intra-device MMW communications of the device and use of the non-controlled frequency range for the non-controlled radiation pattern intra-device MMW communications of the device. At step 132, the controller adjusts its controlled and/or non-controlled radiation frequency ranges to avoid a conflict with the frequency ranges of the other device.

In furtherance of the method of FIG. 15, the controller may receive, via the MMW transceiver, an environmental control signal. The controller interprets the environment control signal to determine that the other device is a dominant intra-device resource utilization device and the device is a subservient intra-device resource utilization device. In this instance, the controller of the subservient device backs-off on its use of frequencies that have a conflict. In other words, the present device has a lower priority to the frequencies having a conflict than the other device.

In furtherance of step 132, the controller may determine a portion of the operating frequency range that compares favorably to the controlled radiation frequency range. The controller then coordinates use of the portion of the operating frequency range that compares favorably to the controlled radiation frequency range for the controlled radiation pattern intra-device MMW communications of the device.

In furtherance of step 132, the controller may determine a portion of the operating frequency range that compares favorably to the non-controlled radiation frequency range. The controller then coordinates use of the portion of the operating frequency range that compares favorably to the non-controlled radiation frequency range for the non-controlled radiation pattern intra-device MMW communications of the device.

FIG. 16 is a block diagram of another embodiment of a device A, B, C, or D 12-18 including integrated circuits 136-158. Each of the ICs 136-158 may include one or more MMW transceivers and a plurality of resources. A resource may be a processing resource and/or a memory resource. One or more of the resources of an IC 136-158 may perform a specific function that requires communication with one or more resources of another IC, or ICs. Such communications occur over inter-chip millimeter wave (MMW) communication links 160.

The type of inter-chip MMW communication link 160 that is established for a particular communication depends on the requirements of the communication. The requirements of a communication may include a specified minimum or maximum bandwidth, a desired data rate, a minimum or maximum latency, a desired reliability (e.g., error rate tolerance), duration of use, duty cycle of use, etc. From these requirements, a controller (which may be in one or more of the ICs) determines whether the link should be a dedicated point-to-point link, a dedicated shared link, or a temporary link.

For example, assume that resources of IC 144 will be performing real time high definition video processing for a long duration of time (e.g., once enabled will run until disabled by a user) and the processed data is to be provided to IC 150 for rendering. The requirements for such a communication are high bandwidth, low latency, high reliability, a high duty cycle (e.g., will consume most of the capacity of the link and will be using the link continuously), and for a long duration. From these requirements, the controller determines that a dedicated point-to-point communication link 160 should be established between ICs 144 and 150 and allocates MMW communication resources to support the dedicated point-to-point link. The MMW communication resources include one or more MMW transceivers within each of the ICs, configurable and/or fixed antenna structures associated with the ICs, in-air MMW communication paths, waveguide MMW communication paths, and/or dielectric MMW communication paths.

As another example, assume that resources of IC 140 will be performing a non-real time task where bursts of data are transmitted or received with IC 138. The requirements for such a communication are high bandwidth, low latency, high reliability, a moderate duty cycle (e.g., will consume most of the capacity of the link when using the link, but does not use the link very often), and for a long duration. From these requirements, the controller determines that a dedicated shared communication link 160 should be made available for communications between ICs 140 and 138. The controller may establish a new dedicated shared link or assign such communications to an existing dedicated shared link. The sharing of the link may be done using a collision avoidance technique, a TDMA technique, and/or any other technique for sharing a wireless resource.

As yet another example, assume that resources of IC 144 will be performing a non-real task where a burst of data will be transmitted to IC 138. The requirements for such a communication are moderate bandwidth, moderate latency, moderate reliability, a low duty cycle (e.g., will consume most of the capacity of the link when using the link, but will only use the link once), and for a short duration. From these requirements, the controller determines that a temporary communication link 160 should be established between ICs 144 and 138. In this instance, the controller allocates MMW communication resources to support the one-time communication between ICs 144 and 138. Once the communication has been completed, the link is torn down and the resources are available for re-allocation.

In order to minimize interference between inter-chip MMW communications, a primary controller (e.g., a controller in one of the ICs, or a distributed primary function among a plurality of controllers in the ICs) establishes the MMW communication links 160 in accordance with a frequency use pattern (e.g., frequency bands, controlled radiation pattern, non-controlled radiation pattern, etc.). For instance, one communication link may be established using MMW communication resources to produce MMW communications at a given frequency and another link may be established using MMW communication resource to produce MMW communications at another frequency.

FIG. 17 is a schematic block diagram of an embodiment of integrated circuits 162 and 164, which are representative of any two ICs 136-158 of FIG. 16. Each of the ICs 162-164 includes a controller 172, one or more MMW transceivers 170, a plurality of circuit modules 166, 168, 176, and 178, and a wired and/or wireless (e.g. MMW) internal bus structure 174. A circuit module 166, 168, 176, and 178 may include one or more processing resources, one or more memory resources, and/or any other type of analog and/or digital circuitry. Note that, to facilitate a wireless internal bus 174, the controller 172 and the circuit modules 166, 168, 176, and 178 include one or more MMW transceivers.

The controller 172 may be implemented in one or more of the circuit modules 166, 168, 176, and 178 or as a separate element. In an embodiment, the controller 172 of IC 162 is the primary processor that coordinates allocation of MMW communication resources to support the various types of intra-chip MMW communication links 160 for the device 12-18. In another embodiment, the controllers 172 of the ICs 162-164 function as a distributed primary controller to coordinate allocation of the MMW communication resources to support the links.

In an example of operation, the primary controller obtains potential inter-chip MMW communication links within a device (e.g., determines for each IC, which other ICs it is capable of communicating with). The primary controller also identifies at least one of the inter-chip potential inter-chip MMW communication links 160 as being a dedicated point-to-point MMW link (e.g., where the performance requirements of the link from IC 162 to IC 164 suggest a dedicated point-to-point MMW link). The primary controller then determines the requirements (e.g., frequency spectrum (e.g., one or more channels), radiation pattern, interference acceptable on MMW resources, bandwidth, data rate, latency, reliability, etc.) for the dedicated point-to-point MMW communication link. The primary controller allocates inter-chip MMW resources to support the dedicated point-to-point MMW link when inter-chip MMW resources are available to support the requirements of MMW communication link.

In another example of operation, the primary controller obtains (e.g., determines, looks up, receives, etc.) potential inter-chip MMW communication links within a device. The primary controller then determines for each of the potential inter-chip MMW communication links whether it is a dedicated point-to-point MMW link, a shared dedicated MMW link, or a temporary MMW link. The primary controller then obtains a listing of inter-chip MMW resources within the device. The primary controller then allocates at least some of the inter-chip MMW resources to support the potential inter-chip MMW communication links.

FIG. 18 is a schematic block diagram of a specific embodiment of the device 12-18 of FIG. 16, where the plurality of ICs 136-158 may constitute one or more of a processing module 180, a graphics card 184, a memory controller 182, a main memory 186, an input output (IO) controller 188, an input output (IO) interface 190, an input output (IO) device 192, a peripheral component interconnect (PCI) interface 194, a NAND flash interface 196, NAND flash 198, a host controller 200, and a hard drive 202. Each of the components 180-202 includes at least one MMW transceiver to support MMW communications links 160 with one or more other components.

In this embodiment, the processing module 180 functions as the primary controller for the device and thus coordinates the creation and break down of the inter-chip MMW communication links 160. The links 160 may be dedicated point-to-point links, dedicated shared links, and/or temporary links. In this instance, the processing module 180 allocates inter-chip MMW resources to create dedicated point-to-point MMW links 212 between components where large amounts of data are conveyed at a high duty cycle (e.g., near continuous conveyance of data) and the data must be conveyed over a reliable link with minimal latency. For example, the processing module 180 may allocate resources to create dedicated point-to-point MMW links 212 between the processing module 180 and the memory controller 182, between the graphics card 184 and the memory controller 182, between the main memory 186 and the memory controller 182, and between the IO controller 188 and the memory controller 182.

The processing module 180 also allocates inter-chip MMW resources to create shared dedicated MMW links 214 between components where large amounts of data are conveyed at a low to moderate duty cycle (e.g., bursts of data) and the data must be conveyed over a reliable link with moderate latency. For example, the processing module creates a shared dedicated MMW communication link 214 that is shared by the IO controller 188 communicating with the IO interface 190, the PCI interface 194, and the host controller 200. For instance, when one of the IO interface 190, the PCI interface 194, or the host controller 200 has data to transmit or receive for an associated device, the IO interface 190, the PCI interface 194, or the host controller 200 accesses the shared dedicated MMW link 214 using a link sharing protocol (e.g., collision avoidance, TDMA, etc.) to transmit or receive the data.

The processing module 180 may also allocate inter-chip MMW resources to create temporary MMW links 216 between components where a small to large amount of data is conveyed at a low duty cycle (e.g., infrequent bursts of data) and the data may be conveyed over a reliable link with moderate latency. For example, the processing module 180 may create temporary MMW links 216 between the IO interface 190 and the IO device 192, between the NAND flash interface 196 and the NAND flash 198, and between the host controller 200 and the hard drive 202.

The processing module 180 may change the type of link between components when conditions for the device change. For example, if there is significant and relatively continuous conveyance of data between the main memory 186 and the hard drive 202, the processing module 180 may change the links between the host controller 200 and the hard drive 202 and between the host controller 200 and the IO controller to dedicated point-to-point links. As another example, the processing module 180 may break down the dedicated point-to-point link between the graphics card 184 and the memory controller 182 if the display is disabled. In this example, the MMW communication resources may be used to support other MMW communication links.

FIG. 19 is a logic diagram of an embodiment of a method for allocation of wireless resources that begins at step 218 where the controller 172 obtains potential inter-chip MMW communication links within a device (e.g., for each IC, determine which other ICs it may communicate with). For example, the controller 172 may obtain the potential inter-chip MMW communication links by accessing a lookup table that includes a predetermine listing of potential links. In another example, the controller may determine the potential links by collecting, and subsequently analyzing, data regarding which ICs are active, the MMW resources of the active ICs, the frequency spectrum of the device.

The method continues at step 220 where the controller 172 identifies at least one of the inter-chip potential inter-chip MMW communication links 160 as being a dedicated point-to-point MMW link. For example, the performance requirements of the link from processing module 180 to memory controller 182 suggests a dedicated point-to-point MMW link 212 due to heavy and relatively continuous data transfers therebetween, which should be done with low latency.

The method continues at step 222 where the controller 172 determines requirements (e.g., frequency spectrum (e.g., one or more channels), radiation pattern, interference acceptable on MMW resources, bandwidth, data rate, latency, reliability, etc.) of the dedicated point-to-point MMW link. The requirements may be predetermined for a link (e.g., obtained by use of a look up table) or may be determined in real time as a function of the current state of MMW resource allocations. A further discussion of this step will be provided with reference to FIG. 20.

The method continues at step 224 where the controller determines if inter-chip MMW resources (e.g., MMW transceivers, MMW communication paths, available frequency spectrum, etc.) are available to support the type of MMW communication link. In this regard, the current MMW resources are evaluated in light of the requirements. For example, if the desired number of channels is available, one or more desired MMW communication paths are available, and MMW transceivers are available to support the desired data rate and latency, then the determination is favorable for resource availability. If sufficient MMW resources are not available, the process may repeats at step 218 for another potential link. If sufficient MMW resources are available, the method continues to step 226.

At step 226, the controller 172 allocates the inter-chip MMW resources to support the dedicated point-to-point MMW link. The controller may facilitate allocation of the resources by sending one or more allocation messages to the ICs, controllers of the ICs, and/or circuit modules of the ICs. The allocation message contains specific operational parameters (e.g., link type, channels, channel access, FDMA information, TDMA information, radiation pattern, antenna information, etc.), which the IC, controller of the IC, and/or circuit modules of the IC utilize to establish the link.

FIG. 20 is a logic diagram of an embodiment of a method that further discusses step 222 of FIG. 19. The method begins at step 228 where the controller determines available frequency spectrum from frequency spectrum reserved for dedicated point-to-point MMW links 212. In this regard, the controller (e.g., the primary controller) may access a table look up to determine the available frequency spectrum or the controller may request a listing of frequency spectrum used and/or available for dedicated point-to-point MMW links 212 from the ICs, controllers of the ICs, and/or circuit modules of the ICs.

The method continues at step 230 where the controller 172 determines an available MMW communication medium. The MMW communication medium may be one or more channels of a controlled radiation pattern MMW communication path (e.g., a MMW waveguide path, a MMW dielectric path, a narrow beamformed MMW in-air path, etc.) or one or more channels of a non-controlled radiation pattern MMW communication path (e.g., an in-air path with minimal or no beamforming). The availability of the MMW communication medium is at least partially dependent upon available frequency spectrum for the path. For example, a MMW path (e.g., in-air, waveguide, dielectric) may not be available if an adjacent channel is already in use due to the potential for interference. The controller 38 may determine the communication medium from a table look up or by requesting available MMW communication medium information from the ICs, controllers of the ICs, and/or circuit modules of the ICs.

The method continues at step 232 where the controller 172 obtains the capabilities of the MMW transceiver. The capabilities may include frequency band, channel bandwidth, power level, duty cycle, power source, receiver sensitivity, supported protocols, access method, associated antenna gain, associated antenna directivity, radiation pattern, and/or any other capability to assist in qualifying the transceiver. The determination may be made by a table look up or by requesting the capabilities from the transceiver, from the IC in which the transceiver resides, and/or from the controller of the IC.

The method continues at step 234 where the controller 172 determines whether there is one or more combinations of available spectrum, MMW communication medium, and MMW transceivers that meets a first set of criteria. The first set of criteria establishes that there is one or more combinations that will support a controlled radiation pattern path in accordance with the requirements. For example, the first set of criteria includes a range for desired frequency spectrum (e.g., one or more channels), a desired type of MMW communication path (e.g., a MMW waveguide), and/or minimal acceptable operational capabilities of the MMW transceivers. If the first set of criteria is met, the method continues at step 236 where the controller 172 determines the type of the MMW communication link as a controlled radiation pattern path.

If the first set of criteria is not met for a given combination, the method continues at step 238 where the controller 172 determines if the combination meets a second set of criteria. The second set of criteria establishes that the combination will support a non-controlled radiation pattern path in accordance with the requirements. For example, the second set of criteria includes a range for desired frequency spectrum (e.g., one or more channels), a desired type of MMW communication path (e.g., an in-air MMW path), and/or minimal acceptable operational capabilities of the MMW transceivers. If the second set of criteria is not met, the method continues at step 228 or repeats at step 238 for another combination. If the second set of criteria is met, the controller 172 determines the type of the MMW communication link as a non-controlled radiation pattern path.

FIG. 21 is a logic diagram of another embodiment of a method for allocation of wireless resources that begins at step 242 where the controller 172 identifies at least one other of the inter-chip potential inter-chip MMW communication links as being a shared dedicated MMW link. For example, the performance requirements of the link between the IO controller 188 and the IO interface 190, the PCI interface 194, and the host controller 200 of FIG. 18 suggest a shared dedicated MMW link 214.

The method continues at step 244 where the controller 172 determines requirements for the shared dedicated MMW link. In an embodiment, the requirements may be predetermined for a link or may be determined in real time as a function of the current state of MMW resource allocations.

The method continues at step 246 where the controller 172 determines if there are inter-chip MMW resources are available to support the shared dedicated MMW link in accordance with the requirements of the shared link. If sufficient MMW resources are not available, the method repeats to step 242 or terminates.

If there are sufficient MMW resources available, the method continues at step 248, where the controller 172 allocates inter-chip MMW resources to support the shared dedicated MMW link. In an example, the controller allocates a MMW communication path to support one or more channels and MMW transceivers of the IO controller 188, the IO interface 190, the PCI interface 194, and the host controller 200 to support the shared dedicated inter-chip MMW communication link 214 therebetween.

FIG. 22 is a logic diagram of another embodiment of a method for allocation of wireless resources that begins at step 250 where the controller 172 receives a request for a temporary MMW communication link. The request may be received from any of the ICs that has a need to link with at least one other IC to transfer data for a relatively short period of time (e.g. with a low duty cycle). For example, the performance requirements of the link from IO interface 190 to IO device 192 of FIG. 18 suggest a temporary MMW link 216 due to the low duty cycle of data transfer traffic with the slower IO device 192.

The method continues at step 252 where the controller 172 determines requirements for the temporary MMW link. In an embodiment, the requirements may be predetermined for a link or may be determined in real time as a function of the current state of MMW resource allocations.

The method continues at step 254 where the controller 172 determines if inter-chip MMW resources are available to support the temporary MMW link in accordance with the requirements. If sufficient MMW resources are not available (e.g., too few channels, too much interference, not enough TDMA capacity, etc.), the process may repeat at step 250 or terminate.

If sufficient MMW resources are available, then the method continues to step 256 where the controller 172 allocate inter-chip MMW resources to support the temporary MMW link. In an example, allocation will enable the IO interface 190 and IO device 192 to communicate over the temporary inter-chip MMW communication link 216 to support the low duty cycle of data transfer traffic with the slower IO device 192.

FIG. 23 is a logic diagram of an embodiment of a method for allocation of wireless resources that begins at step 258 where the controller 172 obtains potential inter-chip MMW communication links within a device. This may be done in a manner similar to that of step 218 of FIG. 19. The method continues at step 260 where controller 172 determines, for each of the potential inter-chip MMW communication links, whether it is a dedicated point-to-point MMW link, a shared dedicated MMW link, or a temporary MMW link. In this regard, the performance requirements (e.g., bandwidth, latency, duty cycle, interference avoidance, etc.) of the link essentially dictate the type of link. For example, the link from processing module 180 to memory controller 182 of FIG. 18 is a dedicated point-to-point MMW link 212 due to heavy and regular data transfer traffic therebetween and low latency requirements. The link to/from the IO controller 188 is shared by the IO interface 190, the PCI interface 194, and the host controller 200 and, as such, is a shared dedicated MMW link 214. The link between the IO interface 190 and the IO device 192 is a temporary MMW link 216 due to the low duty cycle of data transfer traffic therebetween.

The method continues at step 262 where the controller 172 obtains inter-chip MMW resources of the device in a manner as previously discussed. The method continues at step 264 where controller 172 allocates the inter-chip MMW resources to support the potential inter-chip MMW communication links. This may done as previously discussed and/or as discussed with reference to FIG. 24.

FIG. 24 is a logic diagram of an embodiment of a method of step 264 of FIG. 23. The method begins at step 274 where the controller 172 allocates a first set of the inter-chip MMW resources to one or more first priority MMW communication links. For example, first priority MMW communication links are ones that require minimal MMW channel interference, routinely carry significant amounts of data, and carry critical data that, if the link fails, the operation of the device would most likely fail.

The method continues at step 276 where the controller 172 allocates a second set of the inter-chip MMW resources to one or more second priority MMW communication links. For example, second priority MMW communication links are of a lower priority than first priority links and may be links that require minimal MMW channel interference, carry significant amounts of data with a moderate duty cycle, and carry data that, if the link fails, the operation of the device would be adversely affected.

The method continues at step 278 where the controller 172 allocates a third set of the inter-chip MMW resources to one or more third priority MMW communication links. For example, third priority MMW communication links are of lower priority than second priority links and are links that can tolerate MMW channel interference, intermittently carry data, and carry data that, if the link fails, the operation of the device would most likely not be adversely affected (e.g., the data would just need to be retransmitted).

To facilitate the allocation of resources to priority based links, the controller may use a pre-determined mapping of the inter-chip MMW resources to the various MMW links (e.g., dedicated point-to-point, dedicated shared, and temporary). The mapping may include a list of MMW resources and how the resource parameters (e.g., link type, channels, channel access, FDMA information, TDMA information, radiation pattern, antenna information, etc.) shall be allocated to support the various MMW links. The mapping may or may not be organized by priority level (e.g., allocation order, best allocation fit, etc.). The method continues to step 272 to determine prioritization.

The controller 172 may further use priorities in determining MMW resource allocation. Such priorities may specify specific sets of resource configurations to produce a desired prioritization objective such as favoring minimal spectrum utilization while compromising on interference levels, or favoring minimum interference levels while compromising on spectrum utilization, or favoring maximum link speeds while compromising on spectrum utilization, and/or any other scheme to favor a particular outcome.

FIG. 25 is a logic diagram of an embodiment of a method for configuration of wireless operation that begins at step 282 where the controller (e.g., 172 of FIG. 17) receives parameters for an inter-chip MMW communication link. The parameters, which may include average bit rate, maximum burst bit rate, minimum bit rate, maximum average bit error rate, latency, RF range, duty cycle, channel access method, channelization, RF bandwidth, channel protocol, may be received from one of the plurality of circuit modules, from a controller, from a look up table, from another device, or from any other apparatus that can provide the parameters.

The method continues at step 284 where the controller interprets the parameters to determine a range of operational requirements. For instance, the range of operational requirements may be a link with a bit rate range of 50 mega-bits-per-second (Mbps) to 70 Mbps and a range capability to support an inter-chip communications link distance of 105 millimeters (mm). An example of the operational requirements will be provided in greater detail with reference to FIG. 26.

The method continues at step 286 where the controller compares the range of operational requirements with configuration options of the MMW transceiver and the configurable antenna structure. The configuration options of the MMW transceiver includes options of coding, carrier frequency, symbols, transmit power, channel access, receiver sensitivity, link type, bandwidth, transmitter duty cycle, and/or other options to configure the transceiver. The configurable antenna structure includes a plurality of antenna elements and a plurality of interconnecting elements, where the configurable antenna structure options relates to different antenna configurations and includes in air direction radiation pattern options, waveguide communication path options, dielectric communication path options, antenna gain options, antenna center frequency options, antenna bandwidth options, and antenna type options. For example, the antenna structure may be configured into one or more dipole antennas, one or more monopole antennas, one or more meandering trace antennas, antenna array, active beamforming, and/or any other antenna configuration that will result in a desired radiation pattern.

The method branches at step 288 to step 290 when the comparison is favorable and back to step 282 when the comparison is not favorable. A favorable comparison indicates that at least one solution set of configuration options substantially meets the requirements interpreted from the operational parameters. For example, configuration option A can provide a 100% duty cycle, 40 Mbps link over a distance of 55 mm is a favorable solution (e.g., it exceeds all the requirements) to support a link requiring 90% duty cycle, 35 Mbps, and a distance of 49 mm. In another example, configuration option B can provide a 89% duty cycle, 34 Mbps link over a distance of 49 mm is a favorable solution (e.g., it is within a low tolerance of some of requirements) to support a link requiring 90% duty cycle, 35 Mbps, and a distance of 49 mm.

At step 290, the controller generates a configuration signal to instruct the MMW transceiver and the configurable antenna structure to implement the one of the configuration options. Once configured, the IC is ready to use the inter-chip MMW communication link for intra-device MMW communications and/or inter-chip MMW communications.

FIG. 26 is a diagram of an example graph of range of operational requirements and configuration options. The graph includes a horizontal axis of estimated path loss and a vertical axis of capacity. In this example, estimated path loss relates generally to the reliability of link that is based on factors such as distance of the RF path between transmitter and receiver, RF path medium (e.g., air, waveguide, dielectric), and channel impairments. Channel impairments may include ambient RF noise, co-channel interference, adjacent-channel interference, and multipath reflections. The capacity relates generally to the amount of data per time interval (e.g., Mbps) the link can support that is based on factors such as modulation type, coding scheme, channel access, channel bandwidth, transmitter power, antenna gain, receiver sensitivity, and implementation efficiency.

The graph includes the operational requirements for three types of links: a dedicated point-to-point link 292, a shared dedicated link 294, and a temporary link 296. The requirements for each type of link have a capacity-estimated path loss area as indicated by the shaded boxes. For example, the requirements for the dedicated point-to-point link range 292 include a relatively low range path loss (e.g. 10-20 dB) since the distance between ICs is short (e.g., 10-20 mm) and a relatively higher capacity range (e.g. 100 Mbps to 1 Gbps) since the ICs will exchange a high volume of data. As another example, the requirements for the shared dedicated link range 294 include a relatively moderate range path loss (e.g. 25-30 dB) since the distance between ICs is moderate (e.g., 30-37 mm) and a relatively moderate capacity range (e.g. 100 Mbps to 500 Mbps) since the ICs will exchange a moderate volume of data. As another example, the requirements for the temporary link range 296 include a relatively high range path loss (e.g. 50-90 dB) since the distance between ICs is long (e.g., 50-150 mm) and a relatively moderate capacity range (e.g. 80 Mbps to 400 Mbps) since the ICs will exchange a moderate volume of data. Note that the various types of links were discussed with reference to FIG. 18.

The graph also includes the configuration options of the MMW transceiver and antenna structure. In this example, the MMW transceiver and antenna structure have six configuration options (A-F) 298-308. Each of the configuration options has a corresponding capacity-estimated path loss area. For example, configuration option A 298 can provide a solution for 40-110 Mbps of capacity and 10-20 dB of path loss. Configuration option B 300 can provide a solution for 400-500 Mbps of capacity and 10-20 dB of path loss. Configuration option C 302 can provide a solution for 850-1100 Mbps of capacity and 10-20 dB of path loss. Configuration option D 304 can provide a solution for 40-110 Mbps of capacity and 22-55 dB of path loss. Configuration option E 306 can provide a solution for 400-500 Mbps of capacity and 22-55 dB of path loss. Configuration option F 308 can provide a solution for 40-110 Mbps of capacity and 60-80 dB of path loss.

The controller uses the graph to determine viable configuration options (e.g., A-F) for a given range of operation requirements. For example, if the range of operation requirements indicates a dedicated point-to-point link having a desired data rate range (e.g., 150 Mbps to 1 Gbps) and a desired estimated path loss range (e.g., 20-40 dB), the controller determines which of the options can substantially fulfill these requirements. In this example, options B and C can fulfill the requirements. As such, the controller may select option B or C to support the link. The controller may use other criteria to make a final selection from the available options. For example, the selection of option C may be preferred if ample reserve resources are available since option C has a higher performance level than option B. Option B may be selected if ample reserve resources are not available.

FIG. 27 is a schematic block diagram of another embodiment of an integrated circuit 310 that includes a plurality of circuit modules 166-168, at least one MMW transceiver 170, a configurable antenna structure 318, a controller 172, and one or more wired and/or wireless bus 174. The configurable antenna structure 318 includes a plurality of antenna elements and a plurality of antenna interconnecting elements, which may be implemented on the same die as the circuit modules, the controller, and the MMW transceiver and/or on an IC package substrate that supports a die of the circuit modules, the controller, and the MMW transceiver. In another embodiment, all or part of the antenna structure may be implemented on a printed circuit board. For a more detailed discussion of a configurable antenna structure refer to co-pending patent application entitled INTEGRATED CIRCUIT ANTENNA STRUCTURE, having a filing date of Dec. 29, 2006, and a Ser. No. 11/648,826.

FIG. 28 is a logic diagram of an embodiment of a method for configuration of wireless operation that further discusses step 284 of FIG. 25. The method begins at step 324 where the controller senses MMW conditions within the IC and external to the IC. MMW conditions include present use patterns, type of active links, actual interference, actual throughput performance, data buffer overruns, bit error rates, message error rates, and/or other conditions that provide performance feedback.

The method continues at step 326 where the controller determines whether the MMW conditions adversely affect performance of the inter-chip MMW communication link for a given operational requirement within the range of operational requirements. A condition that adversely affects performance may hinder the data transfer bit rate, cause missed bits, destroy messages, and/or cease device operations. For example, the MMW conditions may indicate a potential data throughput drop due to the presence of an interferer.

The method branches at step 328 back to step 324 when the determination does not indicate that MMW conditions adversely affect performance and to step 330 performance is adversely affected. At step 330, the controller adjusts the range of operational requirements within the parameters based on the MMW conditions. For example, an adjustment is made to the operational requirements for the configurable antenna to avoid receiving the new interferer that caused a drop in data throughput. As such, the operational requirements are more stringent, but should now avoid the potential reduction in data throughput.

FIG. 29 is a logic diagram of another embodiment of a method for configuration of wireless operation that begins at step 332 where the controller determines whether a second one of the configuration options compares favorably with the range of operational requirements. Such a determination may be triggered by a degradation in performance of the current configuration or may be done periodically.

The method branches at step 334 to step 336 if the comparison is favorable and back to step 332 when the comparison is not favorable. A favorable comparison indicates that a second one of configuration options substantially meets the operational requirements interpreted from the operational parameters. In other words, a second viable choice is identified.

At step 336, the controller compares the second one of the configuration options with the one of the of the configuration options. For example, option B 300 is the one of the of the configuration options (e.g., the original choice) and option C 302 is the second one of the configuration options (e.g., a second viable choice). A favorable comparison indicates that the option C 302 is preferred over option B 300. In other words, the viable second choice is now a better choice (e.g., provides a more efficient link, uses less power, reduces latency, etc.). This may result from changing MMW conditions. For instance, a new interferer is affecting option B 300 significantly more that it affects option C 302. In another instance, the operational requirements changed to be more aligned with option C 302.

The method branches at step 338 to step 340 if the comparison is favorable and back to step 332 when the comparison is not favorable. A favorable comparison indicates that the second one of the configuration options compares favorably with the one of the of the configuration options. In other words, the second viable choice is preferred over the original choice. At step 340 the controller generates a second configuration signal to instruct the MMW transceiver and the configurable antenna structure to change their configuration to implement the second one of the configuration options.

FIG. 30 is a logic diagram of another embodiment of a method for configuration of wireless operation that further discusses step 284 of FIG. 25. The method begins at step 342 where the controller determines a type of path from a path type indication. The path type indicator may be a don't care, a controlled radiation pattern path, or a non-controlled radiation pattern path. For example, a controlled radiation pattern path may be more spectrally efficient to support a dedicated point-to-point link since ample spectrum can be reused by other ICs in the vicinity. In another example, a don't care path type may result to support a shared dedicated link since the ICs sharing the MMW resources will likely use a combination of controlled and non-controlled radiation pattern paths between ICs.

The method continues at step 344 where the controller determines the distance between the IC and a destination (e.g., another IC) based on identity of the destination. The path loss can be determined from the distance. The path loss will drive the selection of a series of MMW options to overcome the distance and establish a desired MMW communications link. The method continues at step 346 where the controller determines use of path from a path use indication of dedicated point-to-point link, a shared dedicated link, or a temporary link. The method continues at step 348 where the controller determines a frequency range. The controller uses the path type indication, the identity of the destination, and the path use indication as parameters for determining the range of operational requirements.

FIG. 31 is a logic diagram of another embodiment of a method for configuration of wireless operation that begins at step 350 where the controller receives the parameters for a shared dedicated inter-chip MMW communication link. The method continues at step 352 where the controller interprets the parameters to determine the range of operational requirements. The method continues at step 354 where the controller compares the range of operational requirements with the configuration options of the MMW transceiver and the configurable antenna structure.

The method branches at step 356 to step 358 if the comparison is favorable and back to step 350 when the comparison is not favorable. A favorable comparison indicates that multiple configuration options compare favorably with the range of operational requirements. In other words, viable choices exist to support the shared dedicated link.

At step 358, the controller selects one of the multiple configuration options based on capacity of a current or near-current use of the shared dedicated inter-chip MMW communication link. For example, configuration options D 304 and E 306 compare favorably with the shared dedicated link range 294. Option E may be selected since option E has more current capacity (e.g., link throughput in bps) than option D.

FIG. 32 is a schematic block diagram of another embodiment of an integrated circuit 315 that includes a plurality of circuit modules 166-168, at least one MMW transceiver 170, a configurable antenna structure 318, and one or more wired and/or wireless bus 174. The configurable antenna structure 318 includes a plurality of antenna elements and a plurality of antenna interconnecting elements, which may be implemented on the same die as the circuit modules, the controller, and the MMW transceiver and/or on an IC package substrate that supports a die of the circuit modules, the controller, and the MMW transceiver. In another embodiment, all or part of the antenna structure may be implemented on a printed circuit board. For a more detailed discussion of a configurable antenna structure refer to co-pending patent application entitled INTEGRATED CIRCUIT ANTENNA STRUCTURE, having a filing date of Dec. 29, 2006, and a Ser. No. 11/648,826.

The MMW section 362 includes a transmitter section and a receiver section. The receiver section amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing module 360 converts the inbound symbol stream into inbound data (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The baseband processing module 360 also converts outbound data (e.g., voice, text, audio, video, graphics, etc.) into outbound symbol stream in accordance with one or more wireless communication standards (e.g., GSM, CDMA, WCDMA, HSUPA, HSDPA, WiMAX, EDGE, GPRS, IEEE 802.11, Bluetooth, ZigBee, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. The baseband processing module 360 provides the outbound symbol stream to the transmitter section of the MMW section 362.

The transmitter section converts the outbound symbol stream into an outbound RF signal that has a carrier frequency within a given frequency band (e.g., 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/-\Delta A$ [amplitude shift] and/or $A(t)$ [amplitude modulation]) that adjusts the amplitude of the oscillation to produce the outbound RF signal.

FIG. 33 is a logic diagram of another embodiment of a method for configuration of wireless operation which begins at step 364 where the baseband processing module 360 receives parameters for an inter-chip MMW communication link. The method continues at step 366 where the baseband processing module 360 interprets the parameters to determine a range of operational requirements.

The method continues at step 368 where the baseband processing module determines a desired protocol to support a capacity component of the range of operational requirements. The desired protocol is determined from a plurality of protocols, wherein the determination is based on at least one of coding options, carrier frequency options, symbol options, transmit power options, channel access options, and receiver sensitivity options.

The method continues at step 370 where the baseband processing module determines a desired antenna configuration of the configurable antenna structure based on the desired protocol and an estimated path loss component of the range of operational requirements. The desired antenna configuration is determined from a plurality of antenna configurations, wherein the determination is based on at least one of in air direction radiation pattern options, waveguide communication path options, dielectric communication path options, antenna gain options, antenna center frequency options, antenna bandwidth options, and antenna type options.

The method continues at step 372 where the baseband processing module converts outbound data into an outbound symbol stream in accordance with the desired protocol. The MMW section 362 converts the outbound symbol stream into an outbound MMW signal in accordance with the desired protocol, where the outbound MMW signal is transmitted via the configurable antenna structure configured in accordance with the desired antenna configuration.

The method continues at step 374 wherein the baseband processing module converts an inbound symbol stream into inbound data in accordance with the desired protocol. The MMW section 362 converts an inbound MMW signal into the inbound symbol stream in accordance with the desired protocol, wherein the inbound MMW signal is received via the configurable antenna structure configured in accordance with the desired antenna configuration.

FIG. 34 is a logic diagram of another embodiment of a method for configuration of wireless operation that begins at step 376 where the controller receives parameters for an inter-chip MMW communication link. The method continues at step 378 where the controller interprets the parameters to determine a range of operational requirements. The method continues at step 380 where the controller compares the range of operational requirements with configuration options of the MMW transceiver and the configurable antenna structure.

The method branches at step 382 to step 384 if the comparison is favorable and back to step 376 when the comparison is not favorable. A favorable comparison indicates that multiple configuration options compare favorably with the range of operational requirements. In other words, viable choices exist to support operational requirements.

The method continues at step 384 where the controller selects one of the multiple configuration options based on the type of the inter-chip MMW communication link. For example, the selection criteria may include achieving desired levels of throughput, spectral efficiency, error rate, link margin, interference, resource utilization, reserve resources, and/or any other criteria to selection an option.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprises:
    a plurality of circuit modules;
    a millimeter wave (MMW) transceiver; and
    a controller operably coupled to the plurality of circuit modules and to the MMW transceiver, wherein the controller is further operably coupled to:
        identify potential inter-chip millimeter wave (MMW) communication links within a device, each of the potential inter-chip MMW communication links enabling communication between two or more of a plurality of MMW transceivers resident on the IC and other ICs within the device;
        determine that at least one of the potential inter-chip MMW communication links should be a dedicated point-to-point MMW link between two of the plurality of MMW transceivers;
        determine requirements to establish the dedicated point-to-point MMW link; and
        when inter-chip MMW resources are available to support the requirements, allocate the inter-chip MMW resources to support the dedicated point-to-point MMW link.

2. The IC of claim 1, wherein the controller is further operably coupled to determine the requirements of the MMW communication link by at least one of:
    determining available frequency spectrum from frequency spectrum reserved for dedicated point-to-point MMW links;
    determining available MMW communication medium;
    obtaining capabilities of the MMW transceiver;
    determining a type of the MMW communication link as a controlled radiation pattern path when a first set of criteria is met; and
    determining the type of the MMW communication link as a non-controlled radiation patter when a second set of the criteria is met, wherein the criteria includes parameters for the available frequency spectrum, the available MMW communication medium, and the capabilities of the MMW transceiver.

3. The IC of claim 2, wherein the controller is further operably coupled to determine the requirements of the MMW communication link by:
    determining interferers from other MMW communication links, wherein the criteria further includes parameters for the interferers.

4. The IC of claim 1, wherein the controller is further operably coupled to establish when the inter-chip MMW resources are available by at least one of:
    determining whether the inter-chip MMW resources are available to support the type of MMW communication link; and
    accessing a table of pre-assigned inter-chip MMW resources for the type of MMW communication link.

5. The IC of claim 1, wherein the controller is further operably coupled to determine the requirements of the MMW communication link to establish the dedicated point-to-point MMW link by:
    accessing a look up table; or
    obtaining the requirements for the dedicated point-to-point MMW link and determining an optimal link configuration to support the dedicated point-to-point MMW link based on the requirements.

6. The IC of claim 1, wherein the controller is further operably coupled to obtain the potential inter-chip MMW communication links within a device by at least one of:
    accessing a lookup table; and
    determining ICs active in the device, determining MMW resources of the ICs and the IC, determining frequency spectrum of the device, and determining the potential inter-chip MMW communication links based on the MMW resources and the frequency spectrum.

7. The IC of claim 1, wherein the controller is further operably coupled to:
    identify at least one other of the inter-chip potential inter-chip MMW communication links as being a shared dedicated MMW link;
    determine requirements of the shared dedicated MMW link; and
    when other inter-chip MMW resources are available to support the shared dedicated MMW link in accordance with the requirements of the shared dedicated MMW link, allocating the other inter-chip MMW resources to support the shared dedicated MMW link.

8. The IC of claim 1, wherein the controller is further operably coupled to:
    receive a request for a temporary MMW communication link;
    determine requirements for the temporary MMW communication link; and when other inter-chip MMW resources are available to support the temporary MMW communication link in accordance with the requirements of the temporary MMW communication link, allocate the other inter-chip MMW resources to support the temporary MMW communication link.

9. An integrated circuit (IC) method comprises:
a plurality of circuit modules;
a millimeter wave (MMW) transceiver; and
a controller operably coupled to the plurality of circuit modules and to the MMW transceiver, wherein the controller is further operably coupled to:
identify potential inter-chip MMW communication links within a device, each of the potential inter-chip MMW communication links enabling communication between two or more of a plurality of MMW transceivers resident on the IC and other ICs within the device;
determine for each of the potential inter-chip MMW communication links whether it is a dedicated point-to-point MMW link, a shared dedicated MMW link, or a temporary MMW link, at least one of the potential inter-chip MMW communication links being a dedicated point-to-point MMW link between two of the plurality of MMW transceivers;
obtain a listing of inter-chip MMW resources within the device; and
allocate at least some of the inter-chip MMW resources to support at least one of the potential inter-chip MMW communication links.

10. The IC of claim 9, wherein the controller is further operably coupled to allocate the at least some of the inter-chip MMW resources to support the at least one of the potential inter-chip MMW communication links by sequential steps of:
allocating a first set of the inter-chip MMW resources to one or more first priority MMW communication links;
allocating a second set of the inter-chip MMW resources to one or more second priority MMW communication links; and
allocating a third set of the inter-chip MMW resources to one or more third priority MMW communication links.

11. The IC of claim 9, wherein the controller is further operably coupled to allocate the at least some of the inter-chip MMW resources to support the at least one of the potential inter-chip MMW communication links by:
accessing a pre-determined mapping of the inter-chip MMW resources to dedicated point-to-point MMW links, shared dedicated MMW links, or temporary MMW links; and
allocating the inter-chip MMW resources m accordance with the pre-determined mapping.

12. The IC of claim 9, wherein the controller is further operably coupled to obtain the potential inter-chip MMW communication links within a device by at least one of:
accessing a lookup table; and
determining ICs active in the device, determining MMW resources of the ICs and the IC, determining frequency spectrum of the device, and determining the potential inter-chip MMW communication links based on the MMW resources and the frequency spectrum.

13. The IC of claim 9, wherein, prior to allocating the at least some of the inter-chip MMW resources to support the at least one of the potential inter-chip MMW communication links, the controller is further operably coupled to:
determine potential interferers between the potential inter-chip MMW communication links, wherein the controller allocates the inter-chip MMW resources to support the potential inter-chip MMW communication links to substantially avoid the potential interferers.

14. A device comprises:
a plurality of integrated circuits (ICs), wherein an IC of the plurality of IC includes:
a plurality of circuit modules;
a millimeter wave (MMW) transceiver; and
a controller operably coupled to the plurality of circuit modules and to the MMW transceiver, wherein the controller is further operably coupled to:
identify potential inter-chip millimeter wave (MMW) communication links within a device, each of the potential inter-chip MMW communication links enabling communication between two or more of a plurality of MMW transceivers resident on the IC and other ICs within the device;
determine that at least one of the inter-chip potential inter-chip MMW communication links should be a dedicated point-to-point MMW link between two of the plurality of MMW transceivers;
determine requirements to establish the dedicated point-to-point MMW link;
when inter-chip MMW resources are available to support the requirements, allocate the inter-chip MMW resources to support the dedicated point-to-point MMW link; and
communicate, via the MMW transceiver, the allocation of the inter-chip MMW resources to at least one of the plurality of ICs.

15. The device of claim 14, wherein the controller is further operably coupled to determine the requirements by at least one of:
determining available frequency spectrum from frequency spectrum reserved for dedicated point-to-point MMW links;
determining available MMW communication medium;
obtaining capabilities of the MMW transceiver;
determining the requirements to include a controlled radiation pattern path when a first set of criteria is met; and
determining the requirements to include a non-controlled radiation pattern when a second set of the criteria is met, wherein the criteria includes parameters for the available frequency spectrum, the available MMW communication medium, and the capabilities of the MMW transceiver.

16. The device of claim 15, wherein the controller is further operably coupled to determine the requirements by:
determining interferers from other MMW communication links, wherein the criteria further includes parameters for the interferers.

17. The device of claim 15, wherein the controller is further operably coupled to determine the requirements by:
accessing a look up table; or
obtaining requirements for the dedicated point-to-point MMW link and determining an optimal link configuration to support the dedicated point-to-point MMW link based on the requirements.

18. The device of claim 15, wherein the controller is further operably coupled to obtain the potential inter-chip MMW communication links within a device by at least one of:
accessing a lookup table; and
determining active ICs of the plurality of ICs, determining MMW resources of the active ICs and the IC, determining frequency spectrum of the device, and determining the potential inter-chip MMW communication links based on the MMW resources and the frequency spectrum.

19. The device of claim 15, wherein the controller is further operably coupled to:
- identify at least one other of the inter-chip potential inter-chip MMW communication links as being a shared dedicated MMW link;
- determine requirements of the shared dedicated MMW link; and
- when other inter-chip MMW resources are available to support the shared dedicated MMW link in accordance with the requirements of the shared dedicated MMW link, allocating the other inter-chip MMW resources to support the shared dedicated MMW link.

20. The device of claim 15, wherein the controller is further operably coupled to:
- receive a request for a temporary MMW communication link;
- determine requirements of the temporary MMW communication link; and
- when other inter-chip MMW resources are available to support the temporary MMW communication link in accordance with the requirements of the temporary MMW communication link, allocate the other inter-chip MMW resources to support the temporary MMW communication link.

21. A device comprises:
- a plurality of integrated circuits (ICs), wherein an IC of the plurality of ICs includes:
  - a plurality of circuit modules;
  - a millimeter wave (MMW) transceiver; and
  - a controller operably coupled to the plurality of circuit modules and to the MMW transceiver, wherein the controller is further operably coupled to:
    - identify potential inter-chip MMW communication links within a device, each of the potential inter-chip MMW communication links enabling communication between two or more of a plurality of MMW transceivers resident on the IC and other ICs within the device;
    - determine for each of the potential inter-chip MMW communication links whether it is a dedicated point-to-point MMW link, a shared dedicated MMW link, or a temporary MMW link, at least one of the potential inter-chip MMW communication links being a dedicated point-to-point MMW link between two of the plurality of MMW transceivers;
    - obtain a listing of inter-chip MMW resources within the device;
    - allocate at least some of the inter-chip MMW resources to support at least one of the potential inter-chip MMW communication links; and
    - communicate, via the MMW transceiver, the allocation of the inter-chip MMW resources to at least one of the ICs of the plurality of ICs.

22. The device of claim 21, wherein the controller is further operably coupled to allocate the at least some of the inter-chip MMW resources to support the at least one of the potential inter-chip MMW communication links by sequential steps of:
- allocating a first set of the inter-chip MMW resources to one or more first priority MMW communication links;
- allocating a second set of the inter-chip MMW resources to one or more second priority MMW communication links; and
- allocating a third set of the inter-chip MMW resources to one or more third priority MMW communication links.

23. The device of claim 21, wherein the controller is further operably coupled to allocate the at least some of the inter-chip MMW resources to support the at least one of the potential inter-chip MMW communication links by:
- accessing a pre-determined mapping of the inter-chip MMW resources to dedicated point-to-point MMW links, shared dedicated MMW links, or temporary MMW links; and
- allocating the inter-chip MMW resources m accordance with the pre-determined mapping.

24. The device of claim 21, wherein the controller is further operably coupled to obtain the potential inter-chip MMW communication links within a device by at least one of:
- accessing a lookup table; and
- determining active ICs of the plurality of ICs, determining MMW resources of the active ICs and the IC, determining frequency spectrum of the device, and determining the potential inter-chip MMW communication links based on the MMW resources and the frequency spectrum.

25. The device of claim 21, wherein, prior to allocating the at least some of the inter-chip MMW resources to support at least one of the potential inter-chip MMW communication links, the controller is further operably coupled to:
- determine potential interferers between the potential inter-chip MMW communication links, wherein the controller allocates the inter-chip MMW resources to support the potential inter-chip MMW communication links to substantially avoid the potential interferers.

* * * * *

UNITED STATES PATENT AND TRADEMARK OFFICE
CERTIFICATE OF CORRECTION

PATENT NO.         : 8,200,156 B2
APPLICATION NO.    : 12/475501
DATED              : June 12, 2012
INVENTOR(S)        : Ahmadreza Rofougaran It is certified that error appears in the above-identified patent and that said Letters Patent is hereby corrected as shown below:

Col. 32, line 13, in claim 2: replace "patter" with --pattern--
Col. 33, line 50, in claim 11: replace "m" with --in--
Col. 34, line 5, in claim 14: replace "plurality of IC" with --plurality of ICs--
Col. 36, line 26, in claim 23: replace "m" with --in--

Signed and Sealed this
Second Day of April, 2013

Teresa Stanek Rea
*Acting Director of the United States Patent and Trademark Office*